US010775840B2

(12) United States Patent
Lee et al.

(10) Patent No.: US 10,775,840 B2
(45) Date of Patent: Sep. 15, 2020

(54) MIRROR TYPE DISPLAY DEVICE AND METHOD FOR CONTROLLING SAME

(71) Applicant: LG ELECTRONICS INC., Seoul (KR)

(72) Inventors: Doyoung Lee, Seoul (KR); Jungbin Yim, Seoul (KR); Darae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 16/075,045

(22) PCT Filed: Jun. 23, 2016

(86) PCT No.: PCT/KR2016/006717
§ 371 (c)(1),
(2) Date: Aug. 2, 2018

(87) PCT Pub. No.: WO2017/135522
PCT Pub. Date: Aug. 10, 2017

(65) Prior Publication Data
US 2019/0041902 A1    Feb. 7, 2019

(30) Foreign Application Priority Data
Feb. 3, 2016   (KR) .................. 10-2016-0013223

(51) Int. Cl.
*G09G 5/00*        (2006.01)
*G06F 1/16*        (2006.01)
(Continued)

(52) U.S. Cl.
CPC ........... *G06F 1/1605* (2013.01); *G03B 15/00* (2013.01); *G03B 21/60* (2013.01); *G03B 29/00* (2013.01);
(Continued)

(58) Field of Classification Search
CPC . G06F 1/1605; G06F 3/00; G06F 3/01; G06F 3/04845; G06F 1/1698;
(Continued)

(56) References Cited

U.S. PATENT DOCUMENTS

2008/0151092 A1*   6/2008   Vilcovsky ............... G02B 5/08
                                                      348/333.01
2008/0174682 A1    7/2008   Faisman et al.
(Continued)

FOREIGN PATENT DOCUMENTS

WO    WO 2015-020703 A1    2/2015

*Primary Examiner* — Adam R Giesy
(74) *Attorney, Agent, or Firm* — Birch, Stewart, Kolasch & Birch, LLP

(57) ABSTRACT

The present invention relates to a mirror type display device and a control method thereof, and a mirror type display device of the present invention includes a mirror type display; a camera provided on a front surface of the display; an interface for recognizing a user's dress(wear) located in front of the display and a mobile terminal carried by the user through the camera and recommending an operation mode of the recognized mobile terminal based on the recognized dress(wear), and a controller. Thus, the user projecting the image on the mirror-type display device can be photographed to recognize the dress, and the mobile terminal recognized by the user can be recognized to recommend the mode of the mobile terminal suitable for the current dress mode.

20 Claims, 25 Drawing Sheets

(51) Int. Cl.
| | |
|---|---|
| *G06F 3/01* | (2006.01) |
| *G06F 3/00* | (2006.01) |
| *G03B 29/00* | (2006.01) |
| *G03B 15/00* | (2006.01) |
| *G06K 9/00* | (2006.01) |
| *G03B 21/60* | (2014.01) |
| *G06F 3/0484* | (2013.01) |

(52) U.S. Cl.
CPC .......... *G06F 1/1686* (2013.01); *G06F 1/1698* (2013.01); *G06F 3/00* (2013.01); *G06F 3/01* (2013.01); *G06F 3/04845* (2013.01); *G06K 9/00369* (2013.01); *G06K 9/00671* (2013.01)

(58) Field of Classification Search
CPC ...... G06F 1/1686; G06F 3/017; G06F 3/0304; G06K 9/00671; G06K 9/00369; G03B 15/00; G03B 29/00; G03B 21/60
See application file for complete search history.

(56) References Cited

U.S. PATENT DOCUMENTS

| | | |
|---|---|---|
| 2011/0107263 A1 | 5/2011 | Ivanov |
| 2013/0016413 A1 | 1/2013 | Saeedi et al. |
| 2014/0225977 A1* | 8/2014 | Vilcovsky .............. G06Q 30/00 348/14.07 |
| 2015/0026084 A1 | 1/2015 | Guo et al. |

* cited by examiner

【Figure 1a】
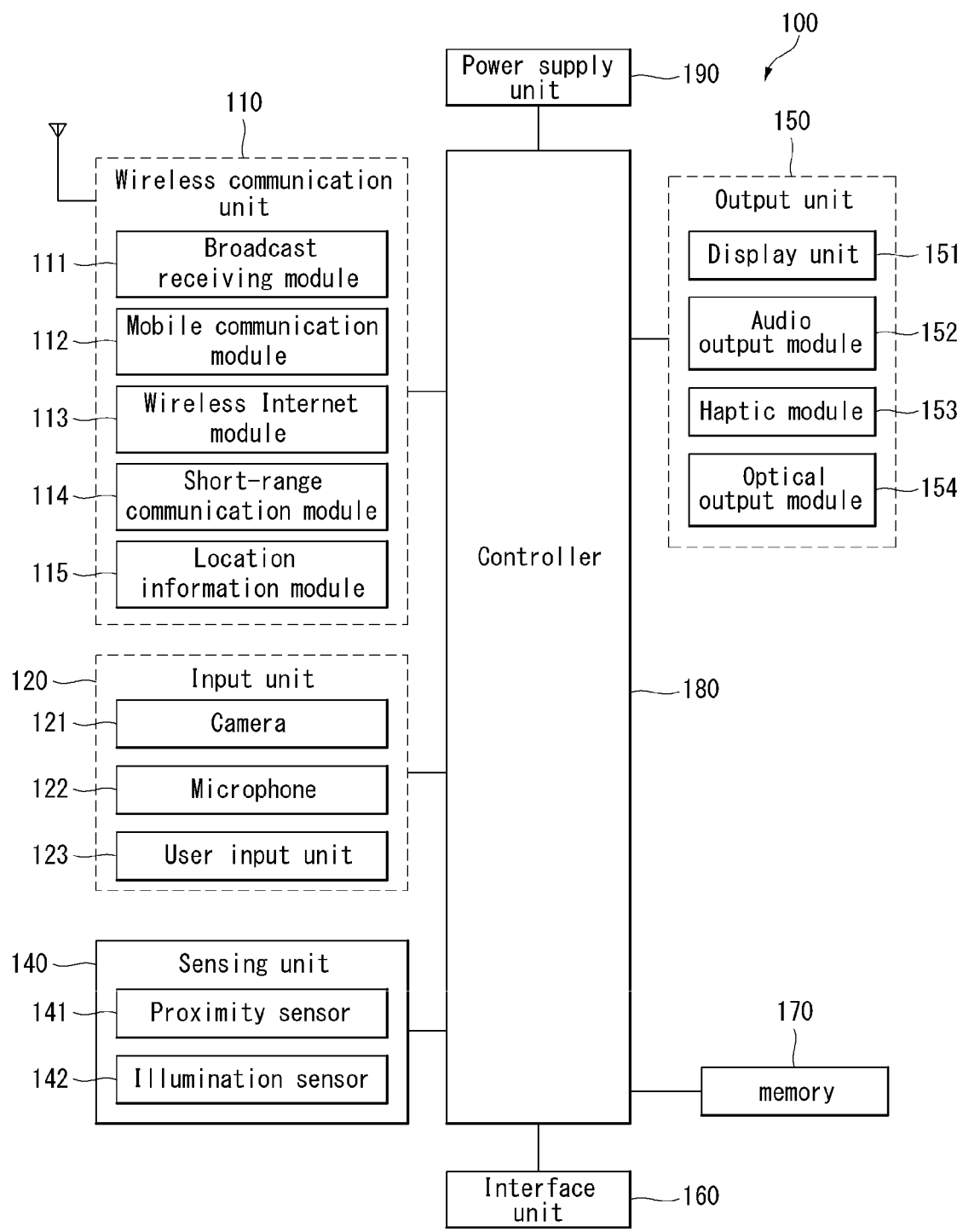

[Figure 1b]
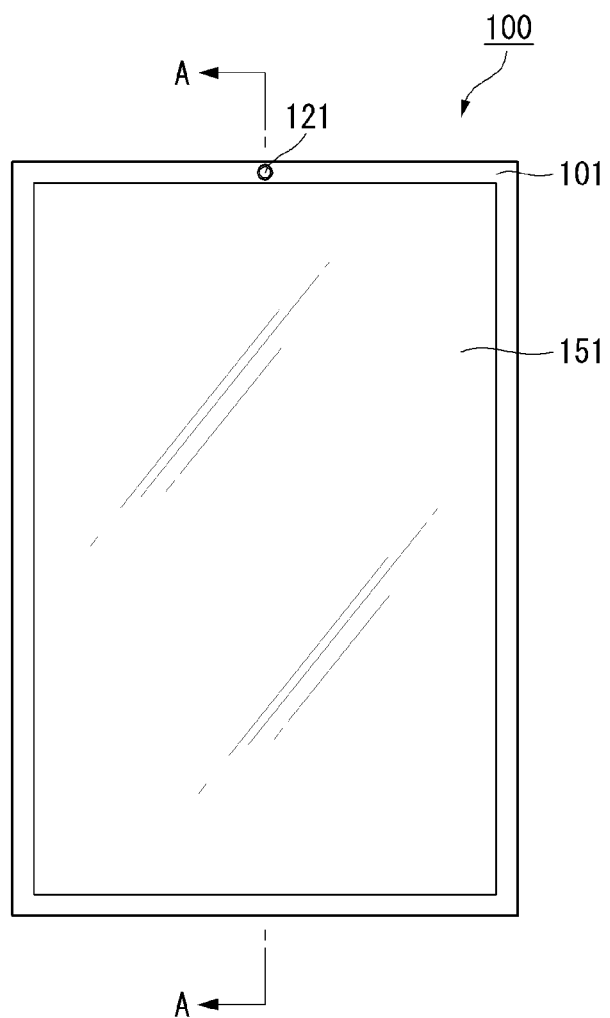

【Figure 1c】
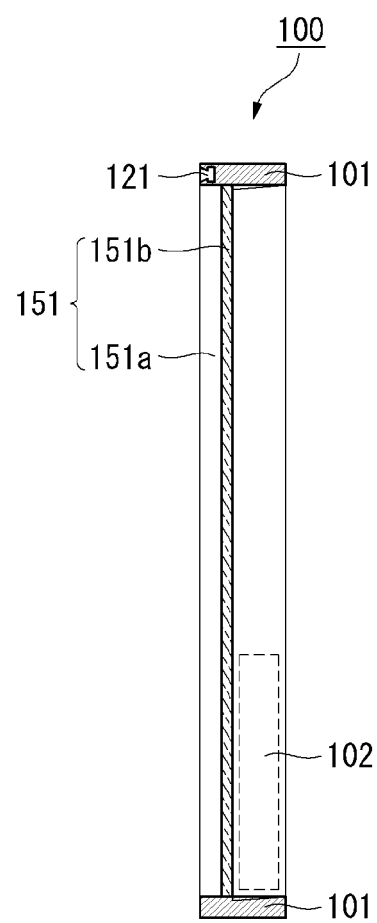

【Figure 2】
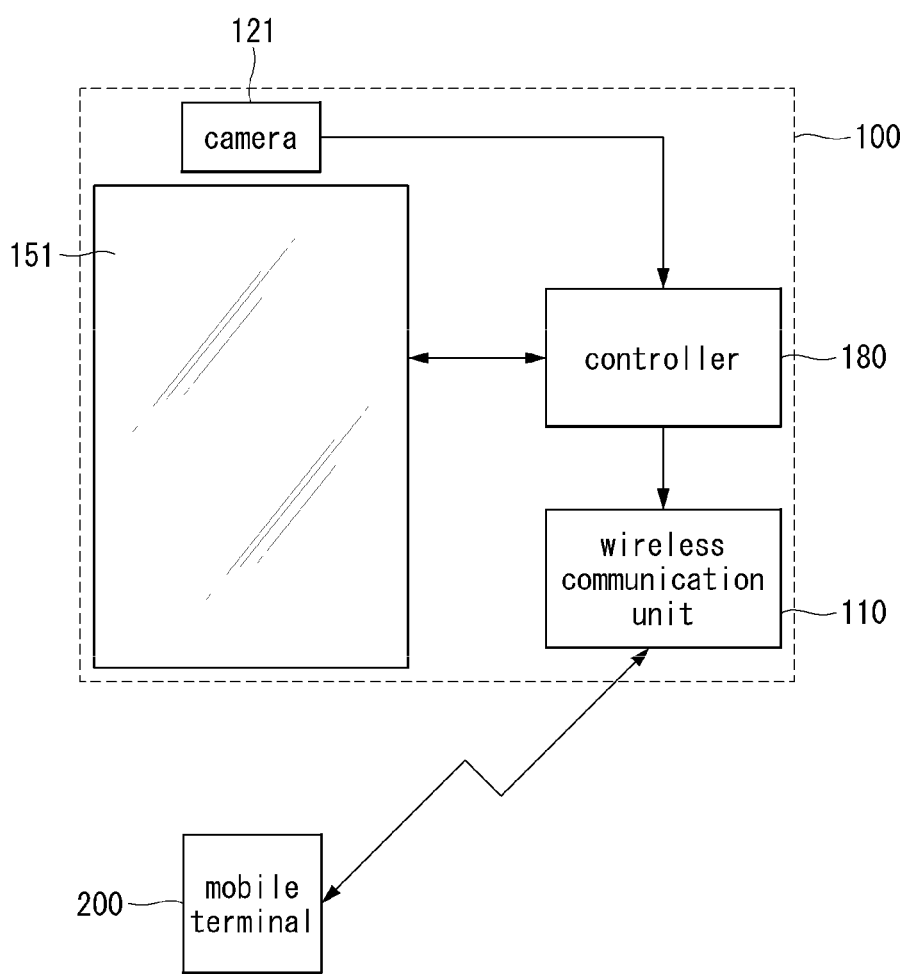

[Figure 3]
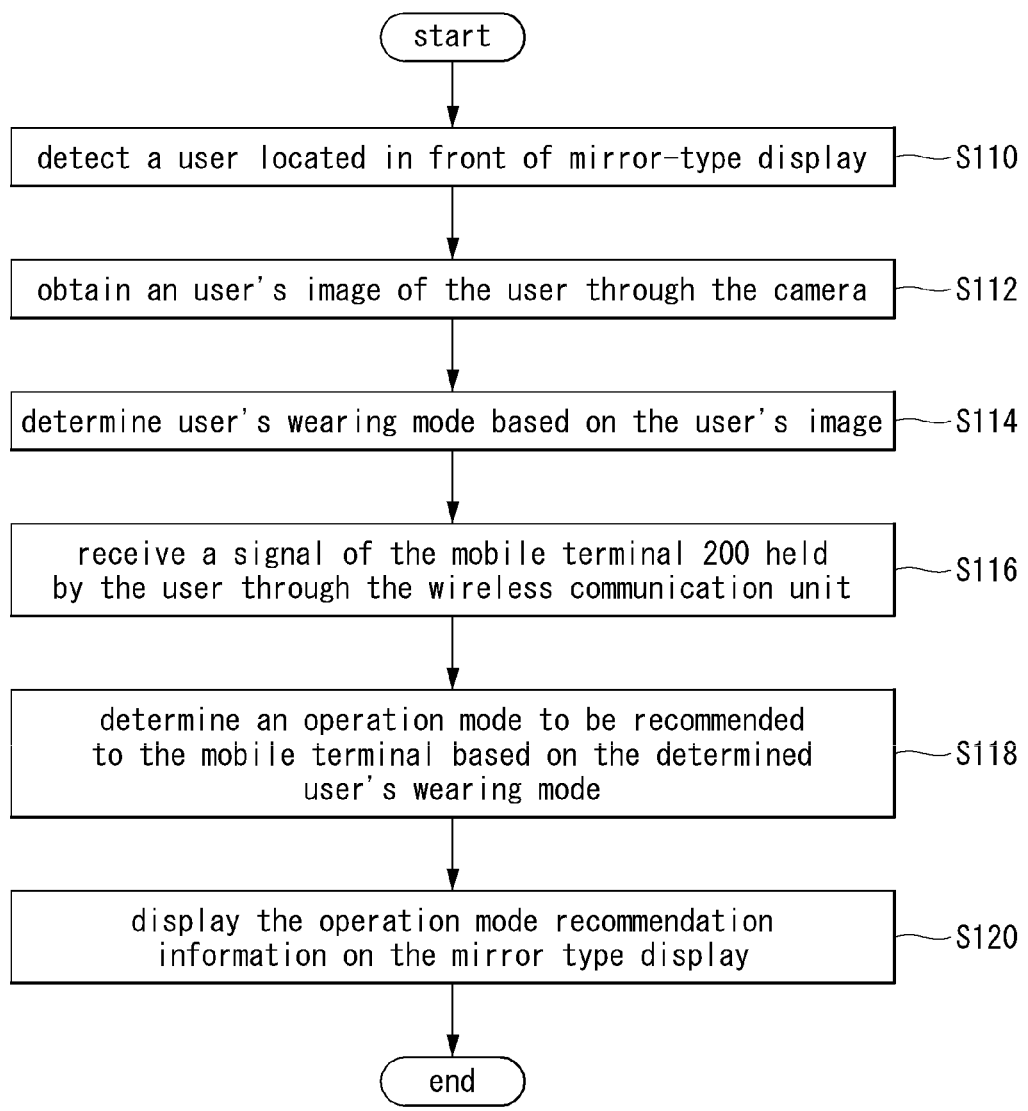

【Figure 4】
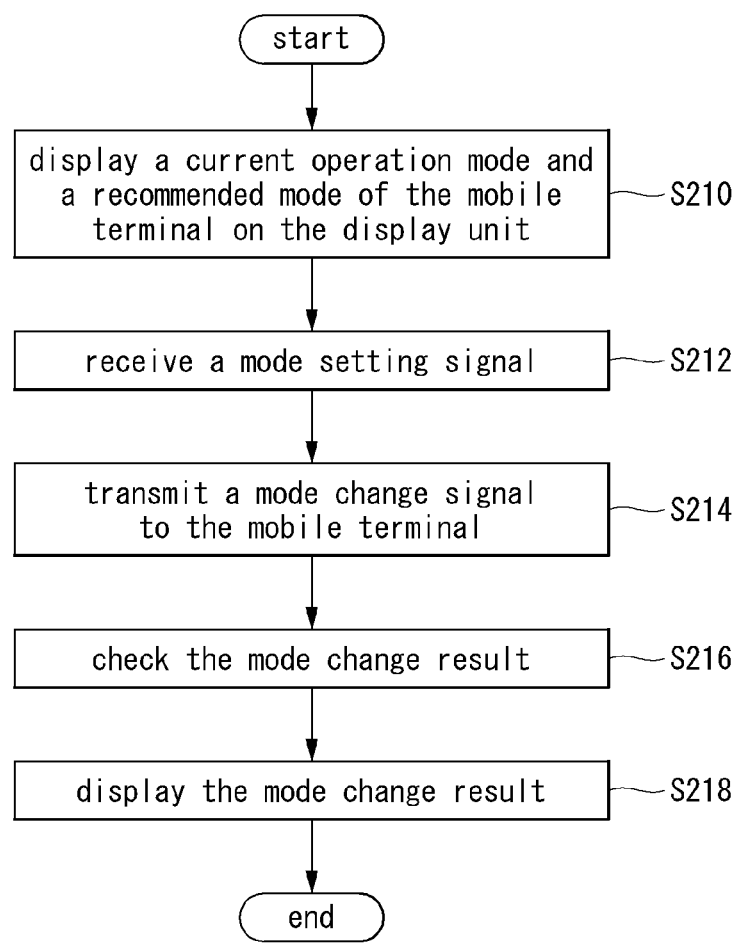

[Figure 5]
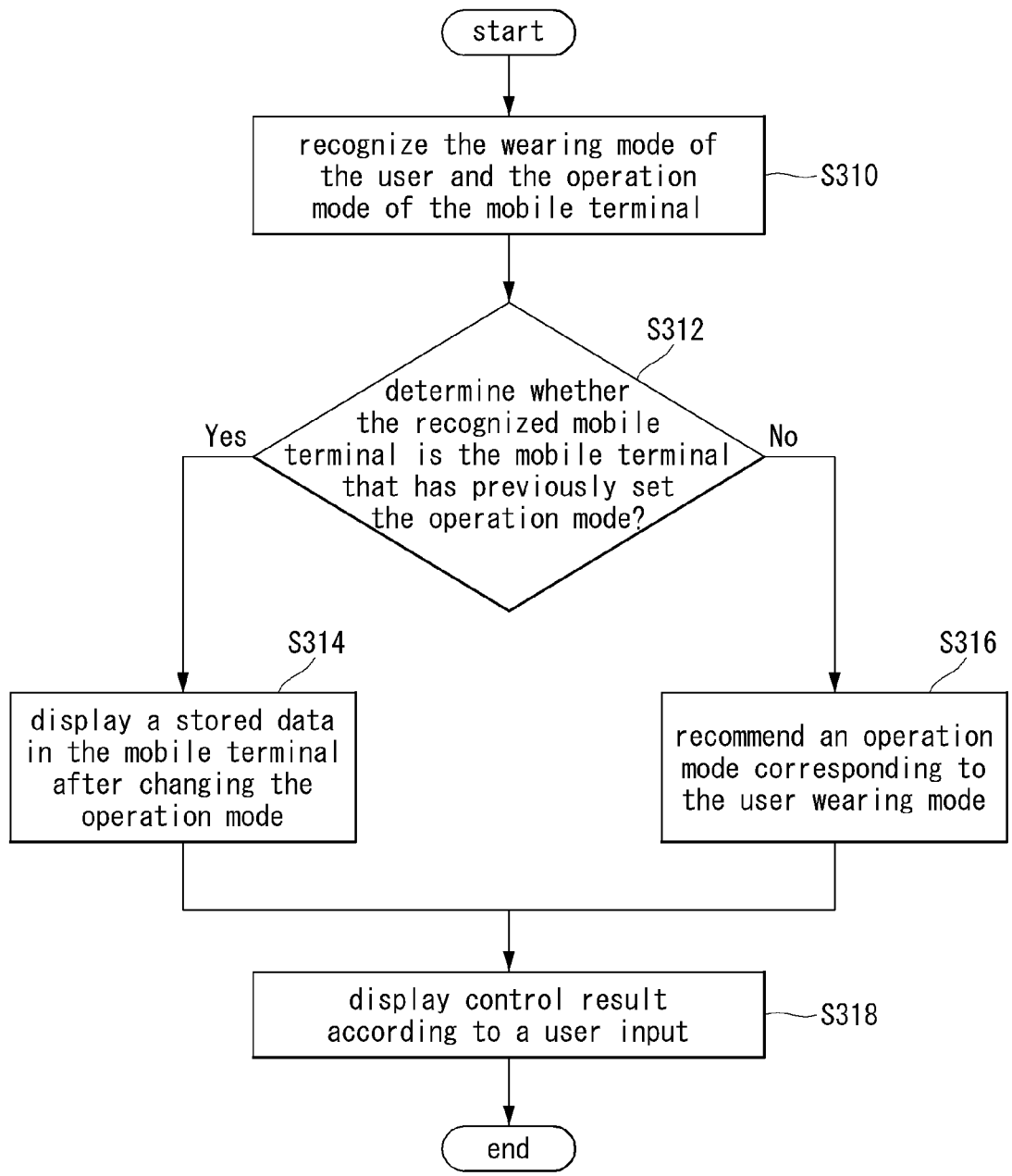

[Figure 6]
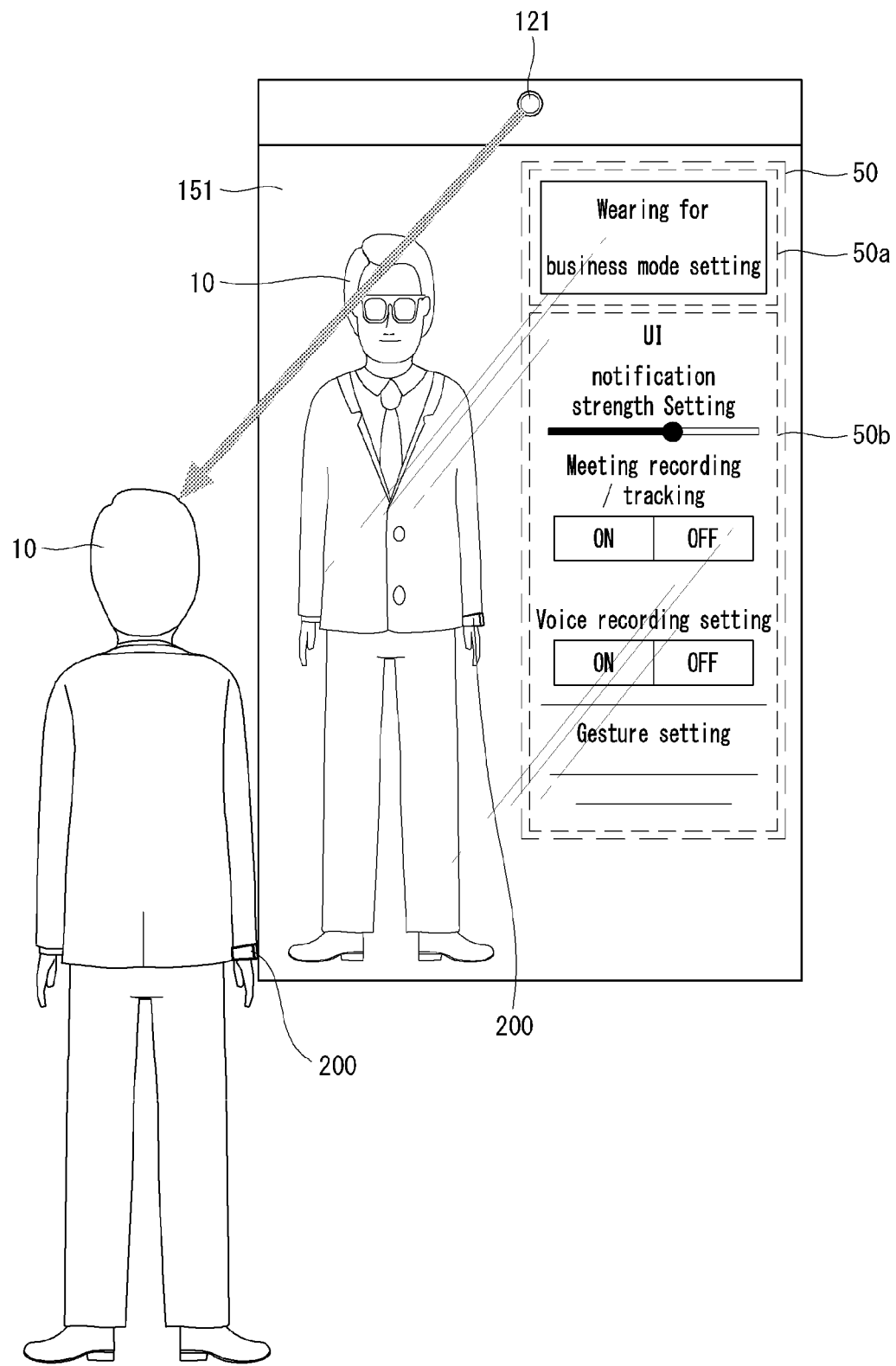

[Figure 7]
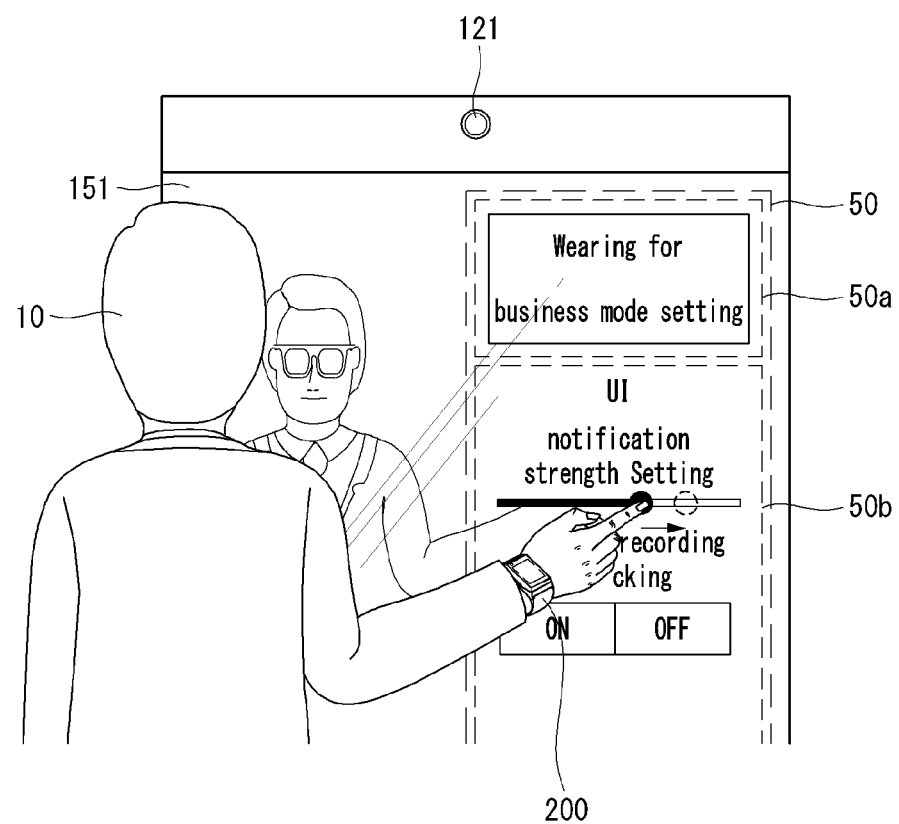

【Figure 8】
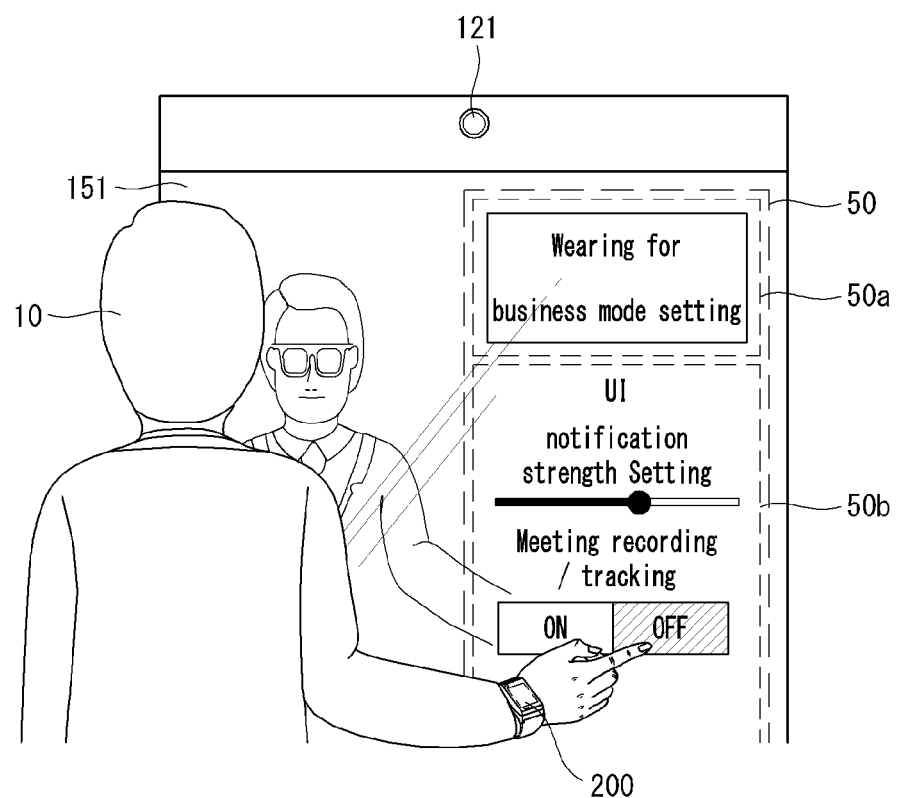

【Figure 9a】
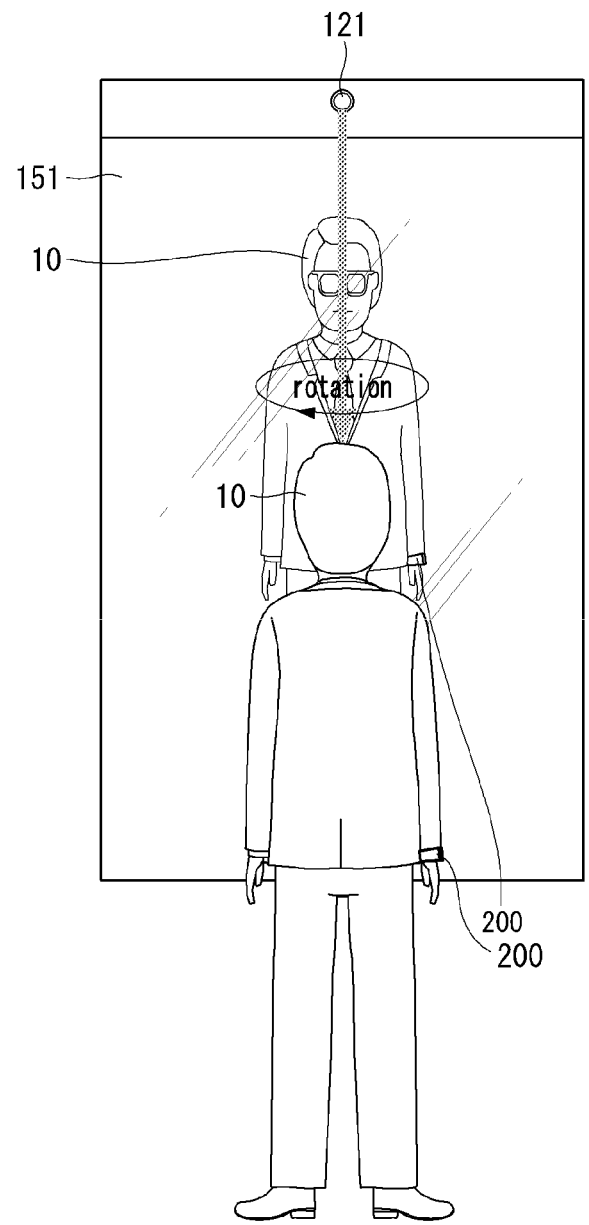

[Figure 9b]
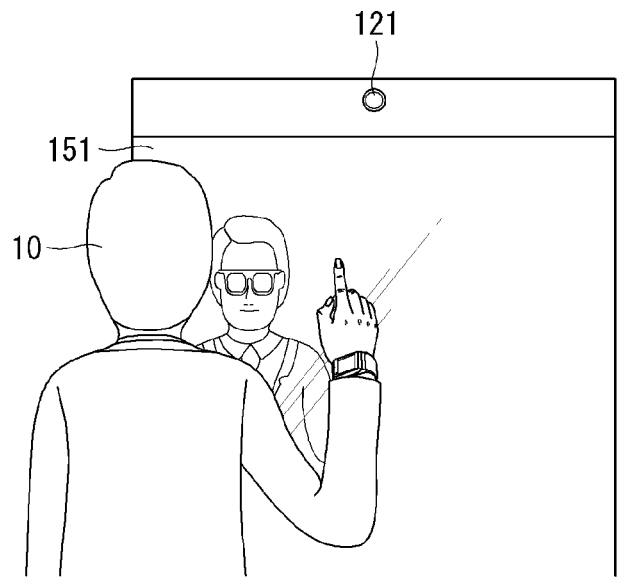
[Figure 9c]
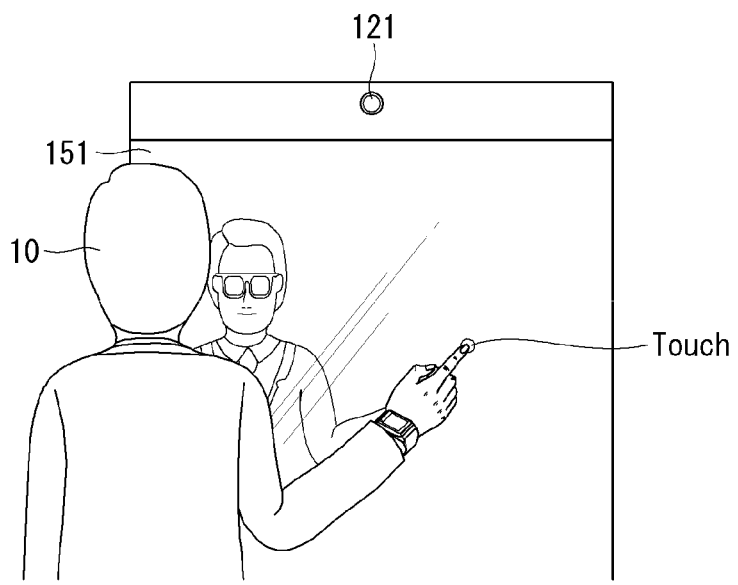

【Figure 10】
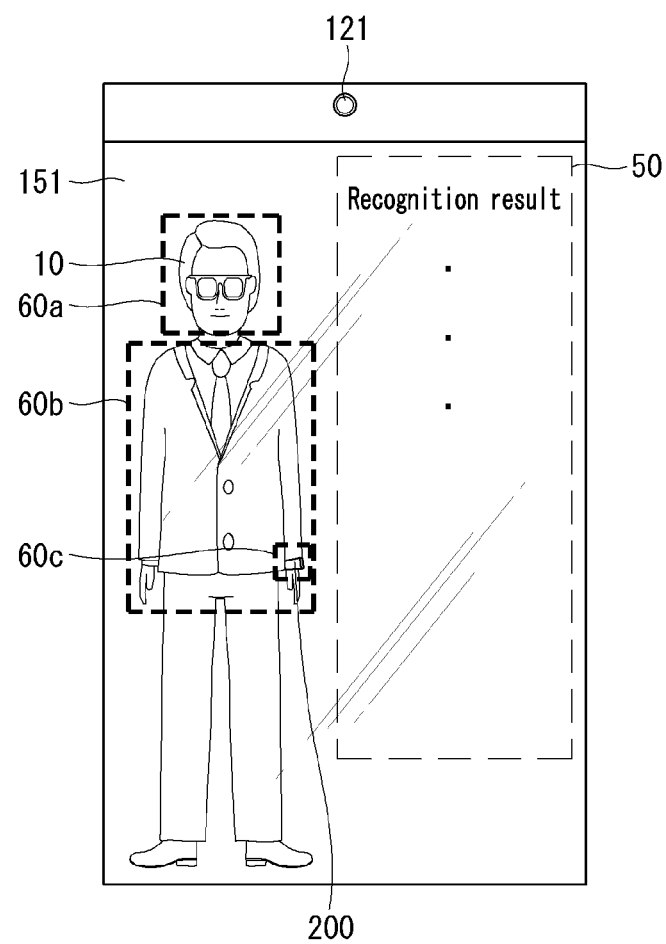

[Figure 11]
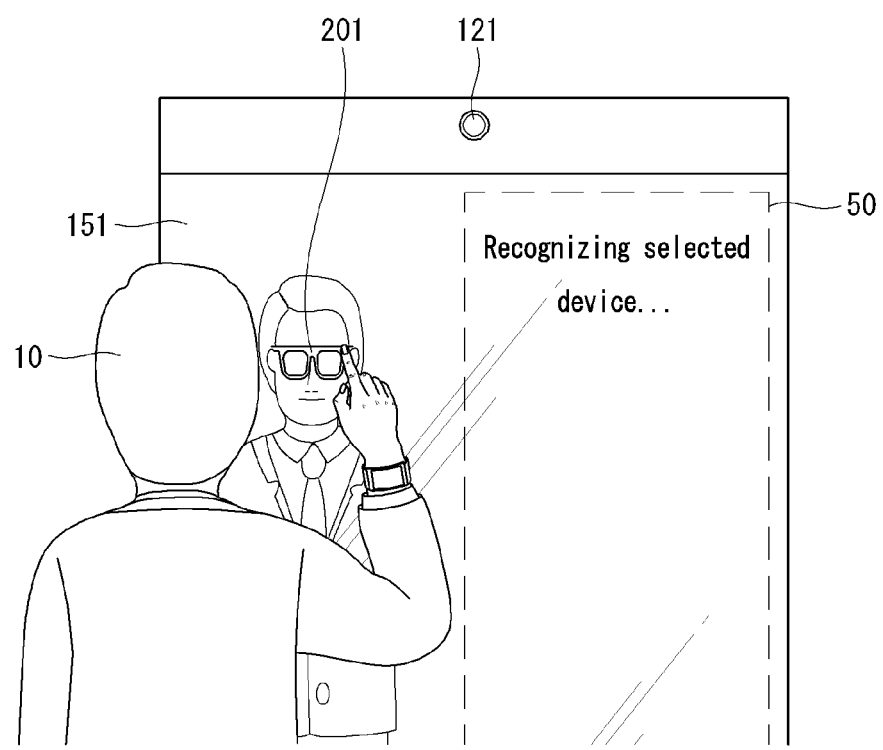

[Figure 12]
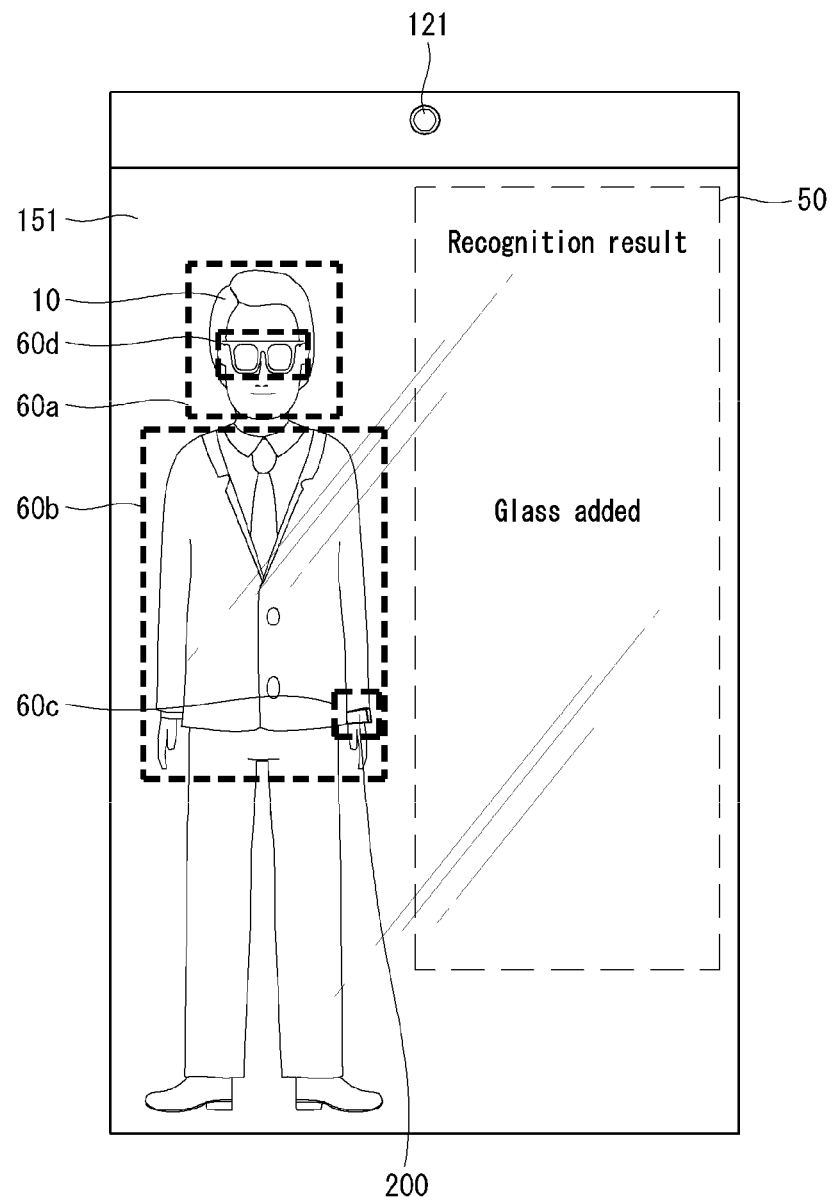

[Figure 13]
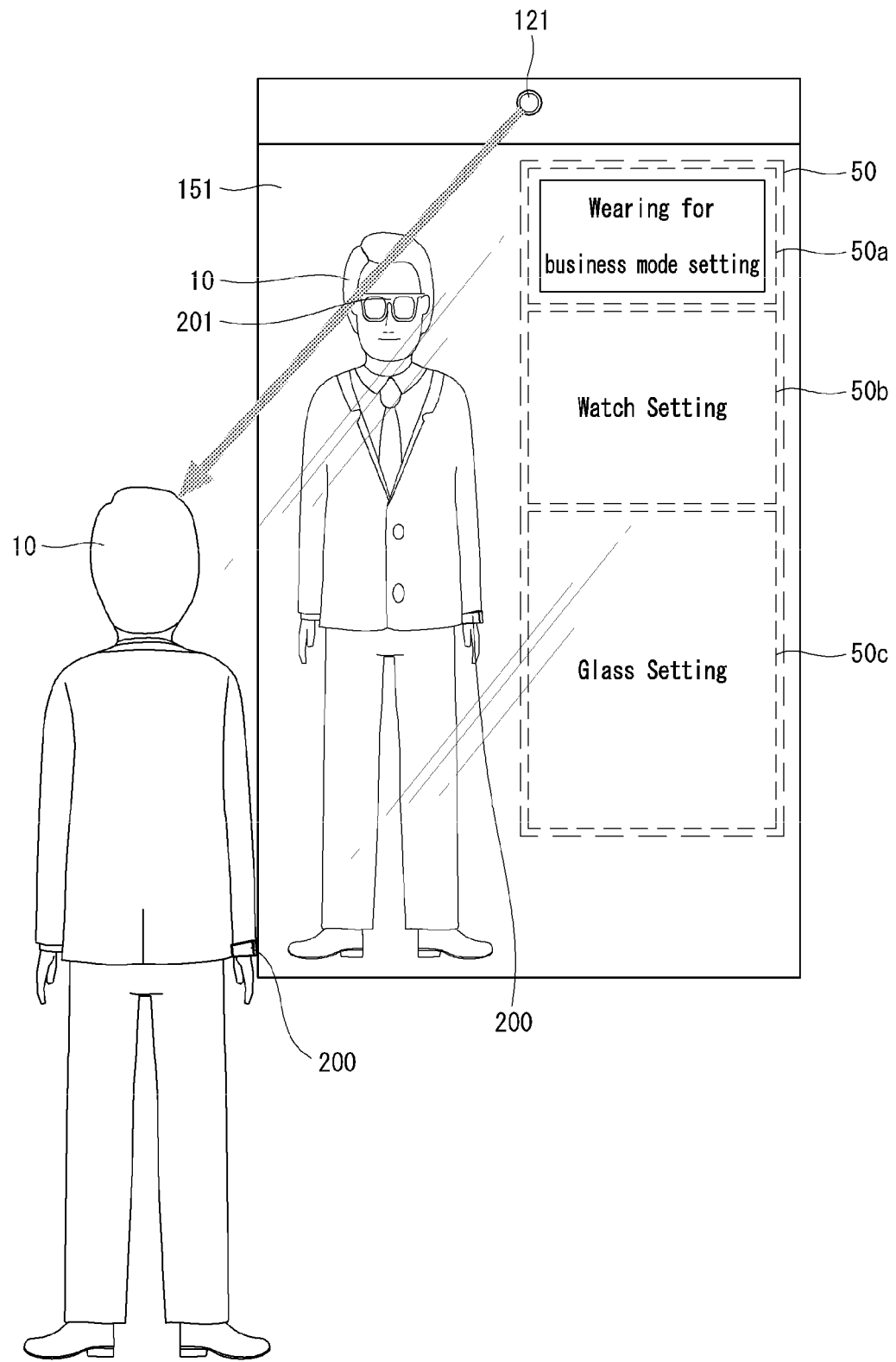

[Figure 14]
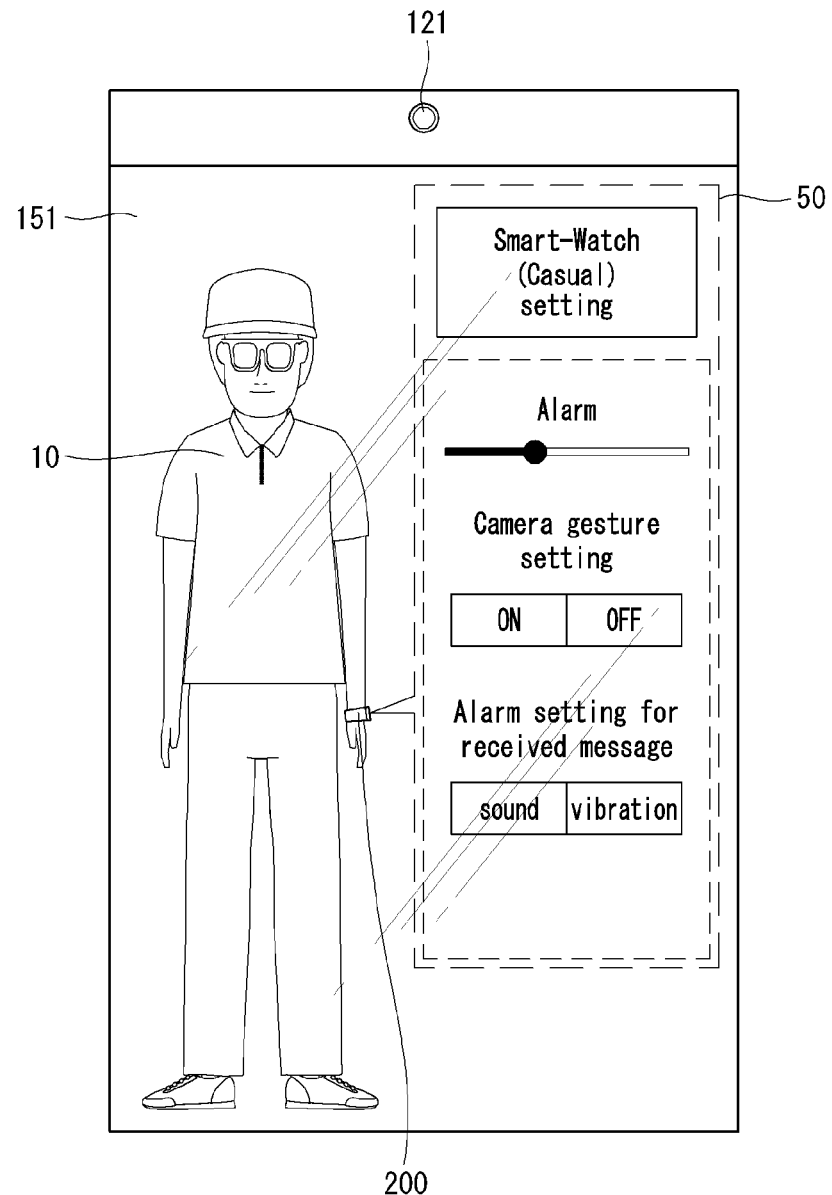

【Figure 15】
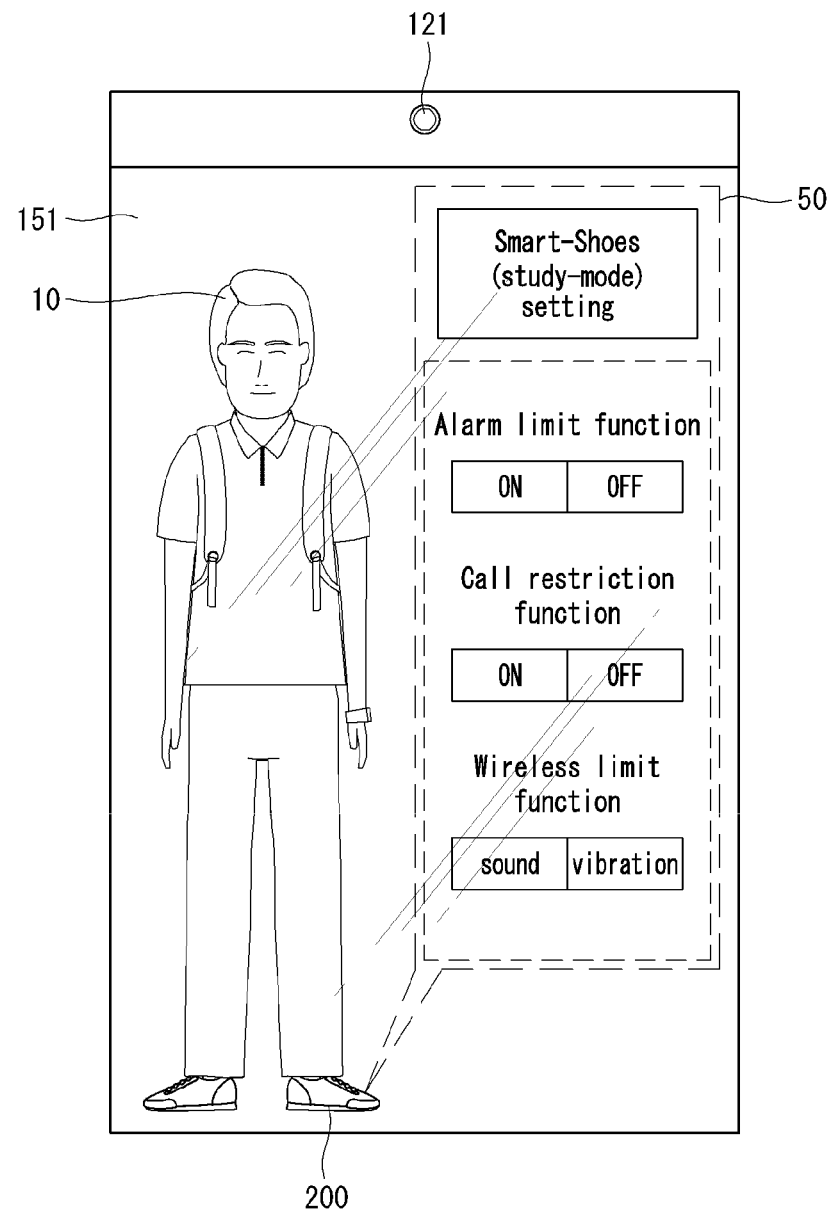

【Figure 16】
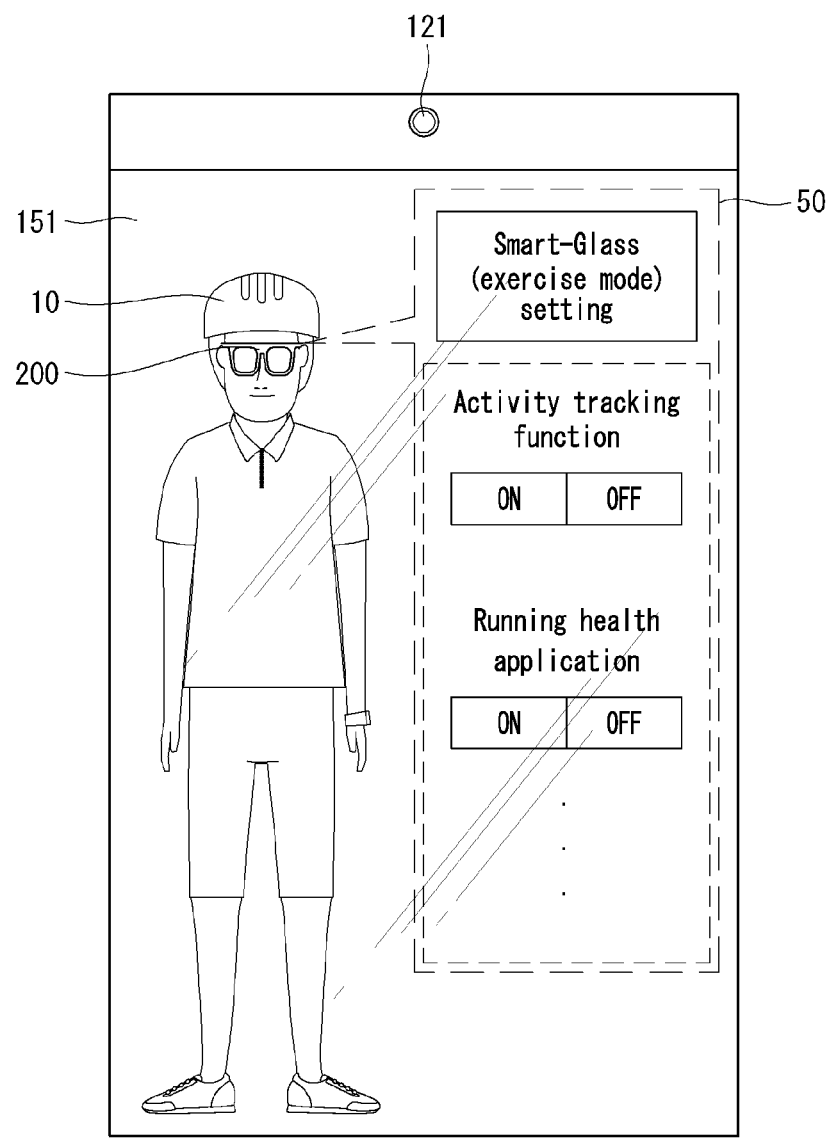

【Figure 17】
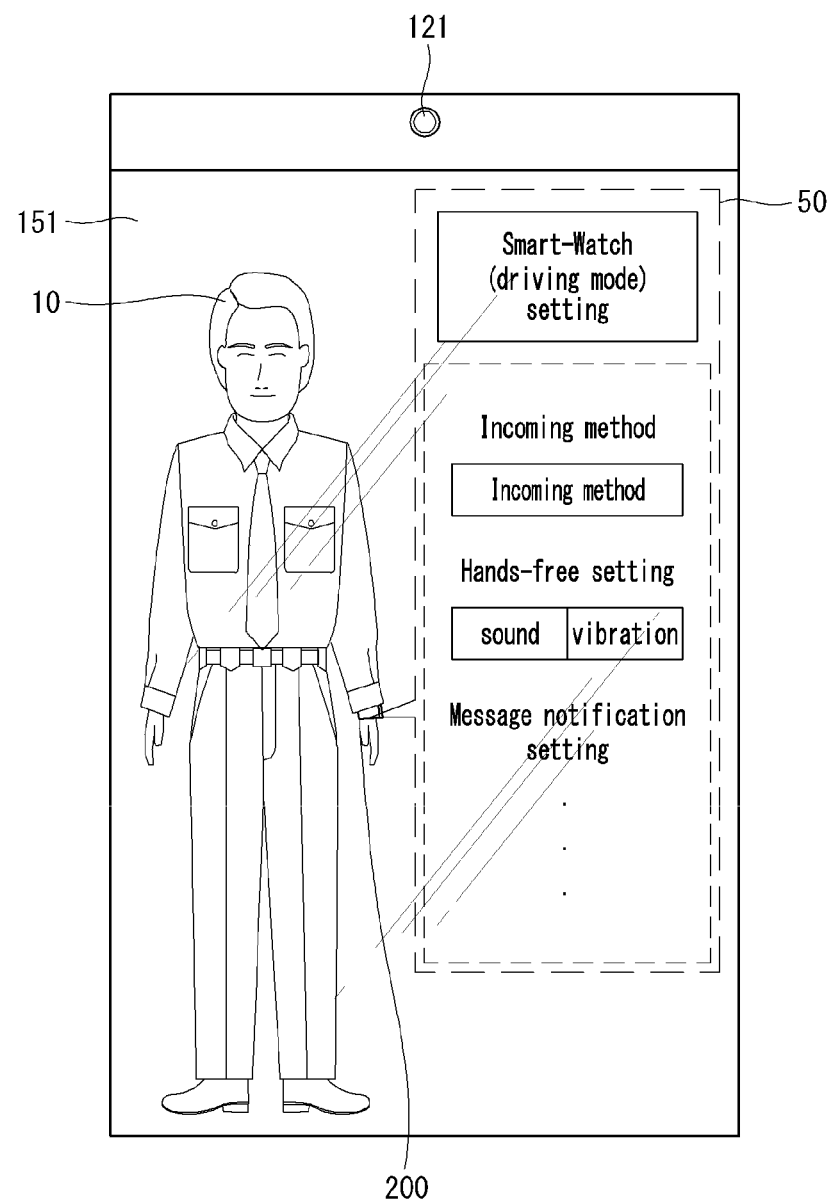

【Figure 18】
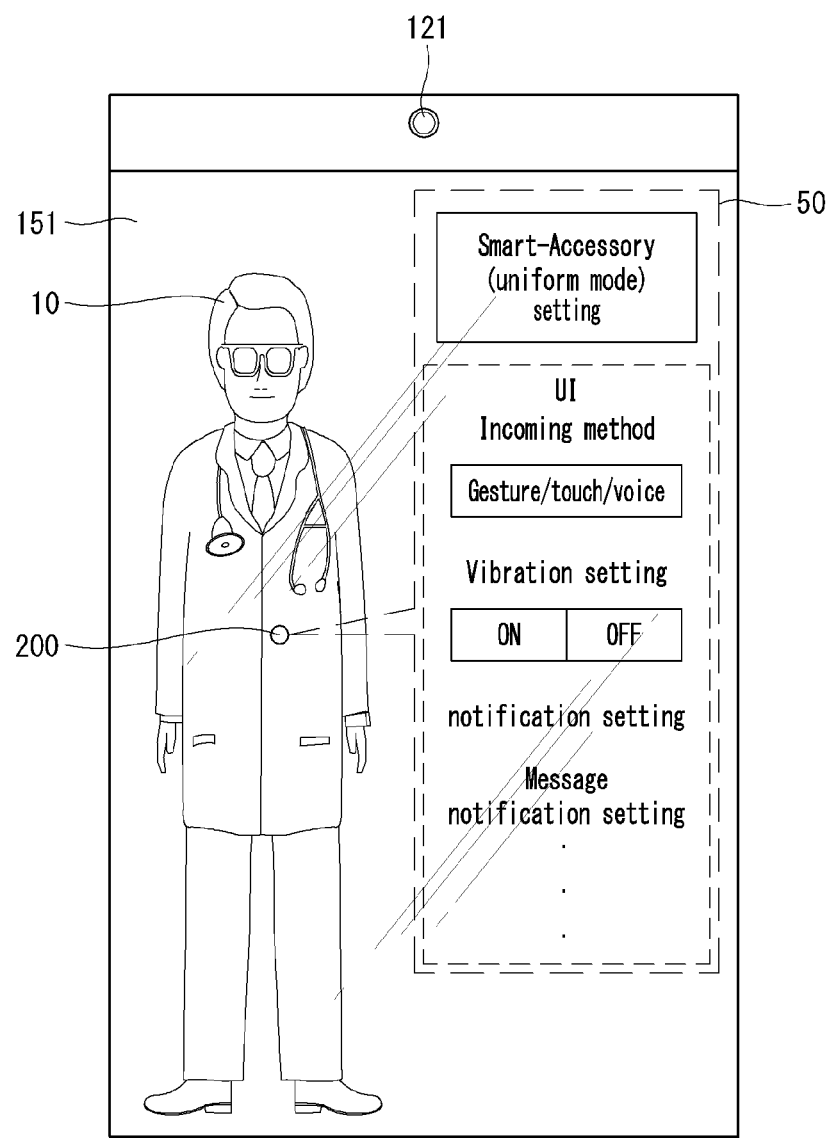

【Figure 19】
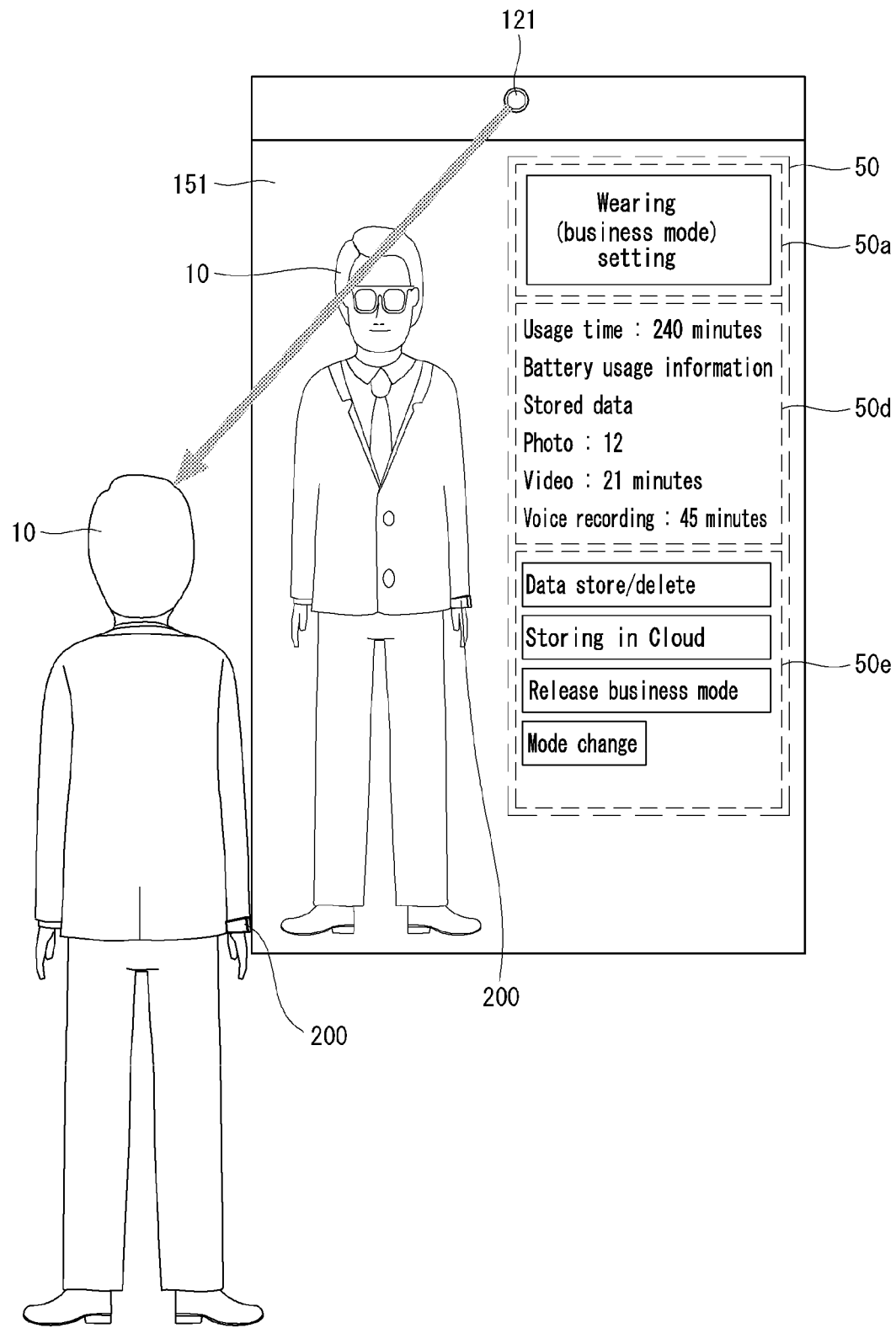

【Figure 20】
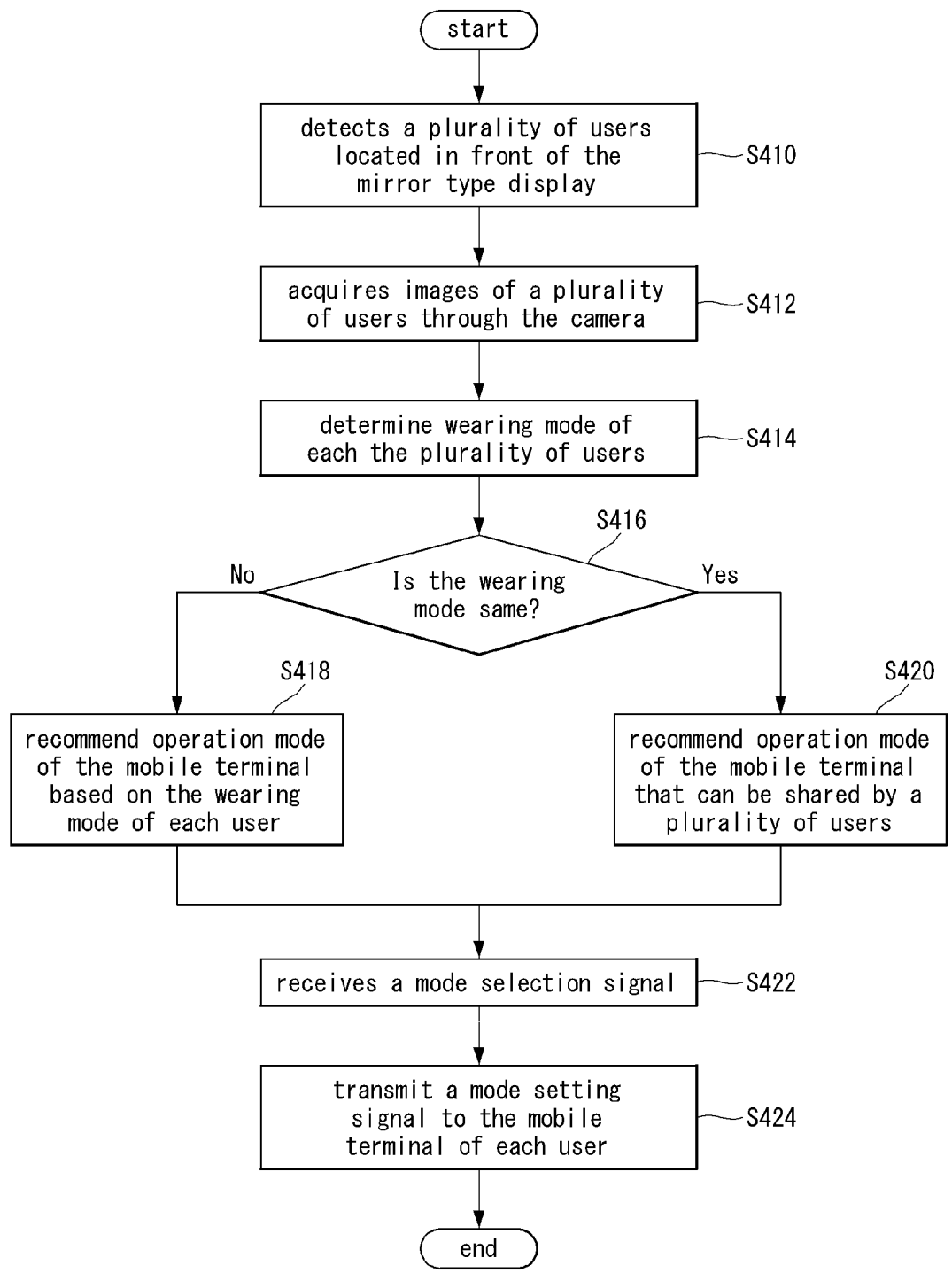

[Figure 21]
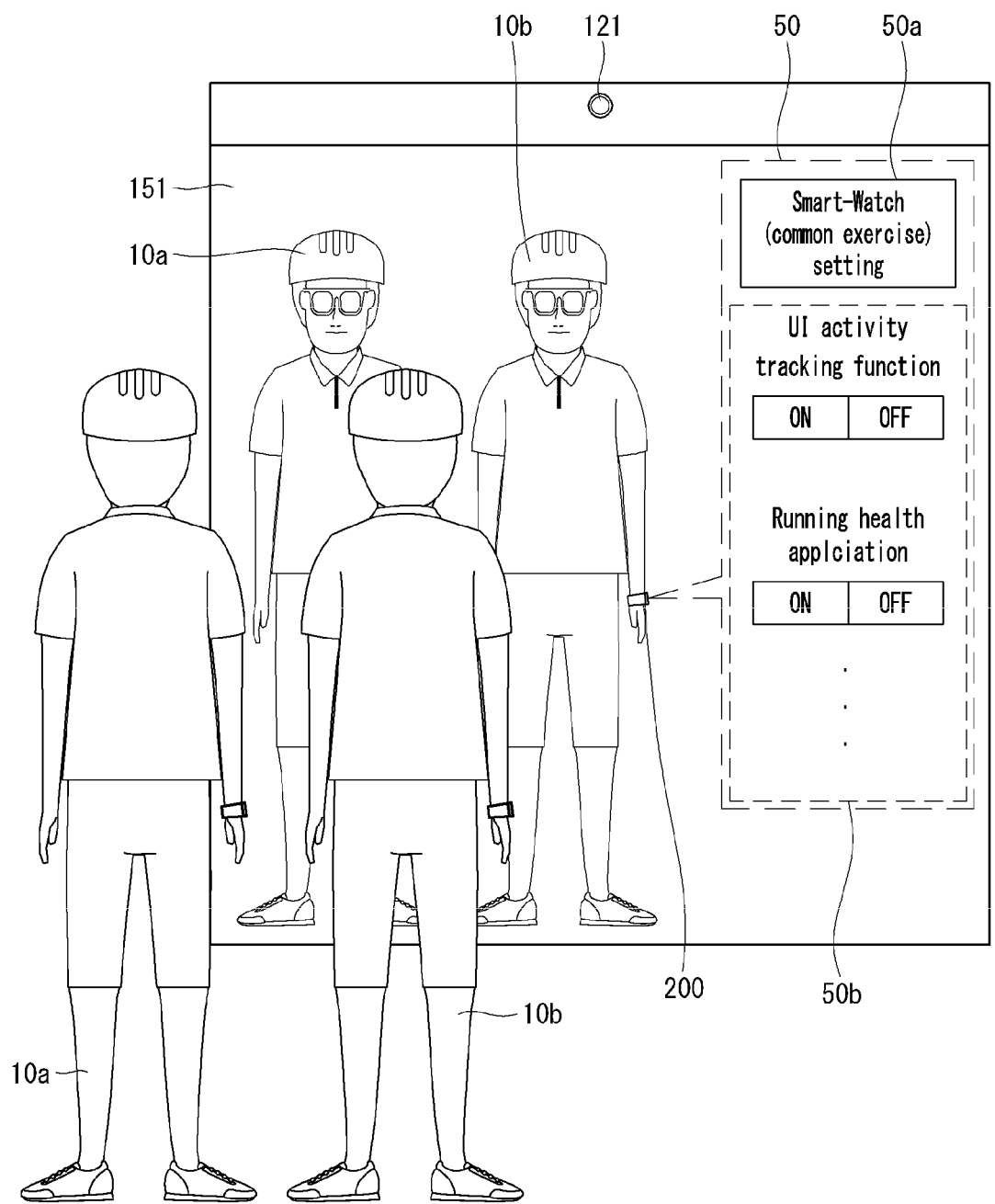

[Figure 22]
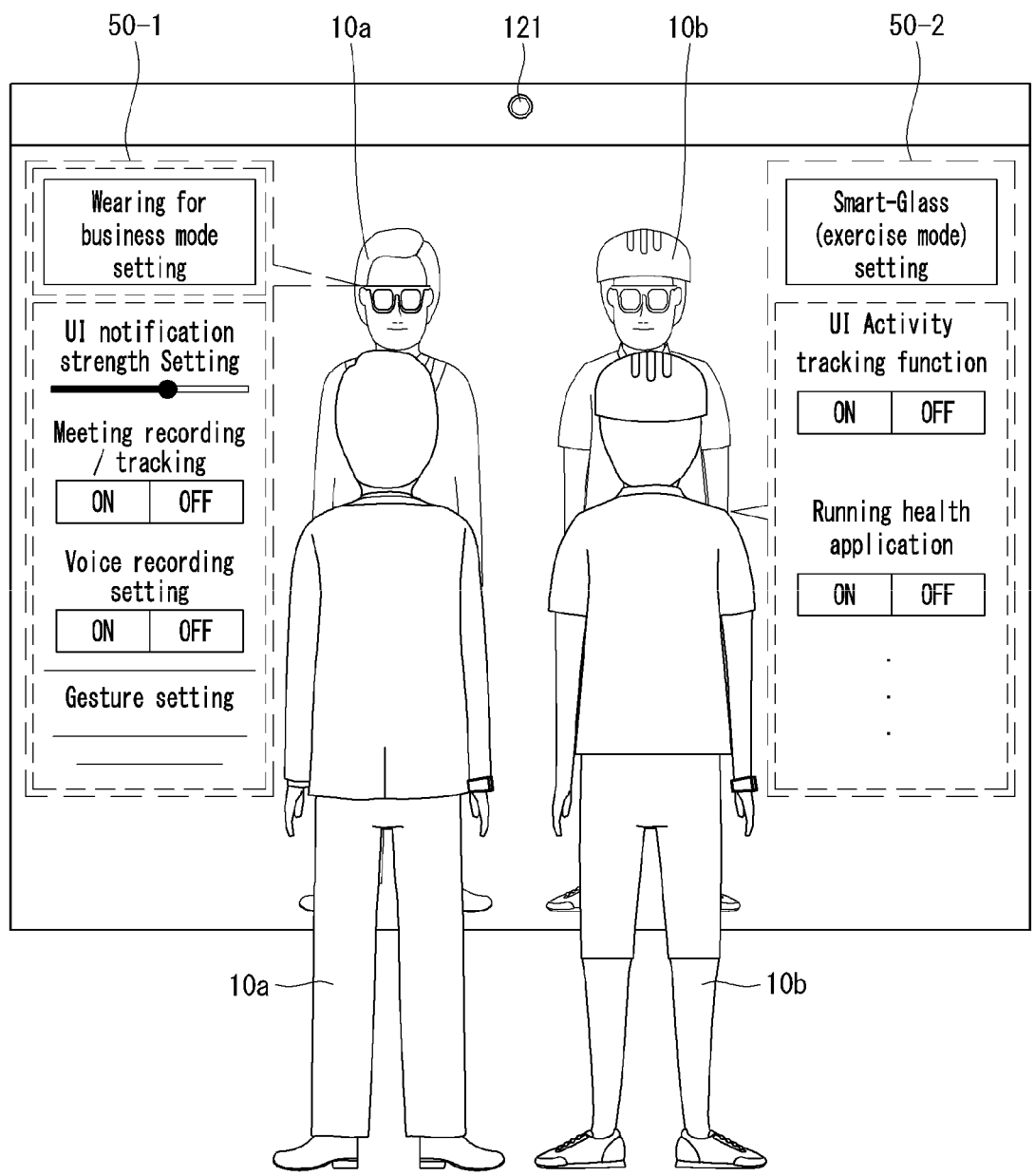

MIRROR TYPE DISPLAY DEVICE AND METHOD FOR CONTROLLING SAME

CROSS REFERENCE TO RELATED APPLICATIONS

This application is the National Phase of PCT International Application No. PCT/KR2016/006717, filed on Jun. 23, 2016, which claims priority under 35 U.S.C. 119(a) to Patent Application No. 10-2016-0013223, filed in Republic of Korea on Feb. 3, 2016, all of which are hereby expressly incorporated by reference into the present application.

TECHNICAL FIELD

The present invention relates to a mirror type display device and a control method thereof.

BACKGROUND ART

The mirror-type display device may include a display device that provides the function of the display together with the function of the mirror.

The mirror type display device may have a mirror on the front surface and a display device on the rear surface of the mirror. At this time, the mirror provided on the front surface uses a half mirror which reflects a part of light and transmits a part of the light. The light reflected by the half mirror acts as a mirror and the light emitted by the display arranged on the rear side can act as a display by transmitting the half mirror.

The mirror type display device constructed in another way may have a transparent liquid crystal element on the front side and a reflective medium having a reflective function on the rear side. When the transparent liquid crystal element provided on the front transmits all the light, the transmitted light is reflected on the reflection medium, and the mirror type display acts as a normal mirror. When data is displayed on a transparent liquid crystal device, light entering the cells in which the data are displayed is blocked, and the corresponding cells can function as a display by emitting light.

DISCLOSURE

Technical Problem

As such, since the mirror type display device can provide the function of the display together with the function of the mirror, it is necessary to develop a technique for effectively providing various information using the mirror type display device.

In recent years, mobile terminals have been implemented in the form of a multimedia device having various functions such as photo shooting and voice recording as well as a simple call function. In addition, the mobile terminal has a wearable device that can be worn on the body, such as a smart watch, a smart glass, and a head mounted display (HMD). It may be considered to develop a technique for interworking with other devices for supporting and increasing the functionality of such a terminal.

Technical Solution

The present invention provides a mirror-type display device and a control method thereof that enable various information to be effectively provided using a mirror-type display device.

It is another object of the present invention to provide a mirror type display device capable of recognizing a wearer who is projecting an image on a mirror type display device and recognizing a mobile terminal possessed by the user and recommending a mode of a mobile terminal suitable for the current dress mode A mirror type display device and a control method thereof.

It is another object of the present invention to provide a user interface capable of changing configuration information of a mobile terminal in a mirror type display device by interlocking with a mirror type display device and a mobile terminal possessed by a user projected on the mirror type display device The present invention provides a mirror-type display device and a control method thereof, which receive setting information of a mobile terminal in a mirror-type display device and control the setting of a mobile terminal held by a user to be changed.

The technical objects to be achieved by the present invention are not limited to the technical problems mentioned above. In addition, other technical objects to be achieved by the present invention will become apparent to those skilled in the art from the following description.

To accomplish the above-noted and other objects, a mirror type display comprising: a mirror type display; a camera provided on a front surface of the display: and a controller configured to: recognize a user's dress and a mobile terminal carried by the user through the camera, the user being located in front of the display, display an interface for recommending an operation mode of the recognized mobile terminal based on the recognized dress on the display.

To accomplish the above-noted and other objects, a mirror type display comprising: a mirror type display; a camera provided on a front surface of the display: a wireless communication unit; a controller configured to: determine a user's wearing mode by capturing wear of a user located in front of the display through the camera, recognize a mobile terminal carried by the user based on a wireless signal received by the wireless communication unit, display an interface for recommending an operation mode of the mobile terminal according to the determined wearing mode on the display, and transmit a control signal for setting the operation mode of the mobile terminal through the wireless communication unit based on an input signal received through the interface.

To accomplish the above-noted and other objects, a method for controlling a mobile terminal configured to share a display with an external terminal, according to another aspect of the present invention, includes: displaying a first image through a first touchscreen provided to the front of the mobile terminal; and extending an area capable of displaying the first image to a second touchscreen of the external terminal, including the first touchscreen, when one side of the body comes into contact with one side of the external terminal.

Advantageous Effects

The mirror type display device and the control method thereof according to the present invention have the following effects.

According to the present invention, various information can be effectively provided using a mirror-type display device.

In addition, according to the present invention, a user projecting an image on a mirror-type display device can be photographed to recognize a wearable device and recognize a mobile terminal possessed by the user, thereby recommending a mode of the mobile terminal appropriate for the current wearing mode.

According to another aspect of the present invention, there is provided a display device including a mirror type display device and a mirror type display device, the portable type device being operated by a user projected on the mirror type display device, You can easily change the settings.

DESCRIPTION OF DRAWINGS

FIG. 1a is a block diagram of a mobile terminal according to an embodiment of the present invention;

FIGS. 1b and 1c are conceptual diagrams showing an example of a mirror type display device related to the present invention in different directions.

FIG. 2 is a schematic system configuration diagram for implementing a method of controlling a mirror type display device according to an embodiment of the present invention.

FIGS. 3 to 5 are flowcharts for explaining a method of controlling a mirror type display device according to an embodiment of the present invention.

FIGS. 6 to 19 are diagrams for explaining a control method of a mirror type display device according to an embodiment of the present invention.

FIG. 20 is a flowchart illustrating a method of controlling a mirror type display device according to another embodiment of the present invention.

FIGS. 21 and 22 are diagrams for explaining a control method of a mirror type display device according to another embodiment of the present invention.

MODE FOR INVENTION

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

It will be readily apparent to those skilled in the art that the mirror type display device according to the embodiment described herein may be applied not only to a domestic mirror but also to a mirror in a public place, a billboard in a public place, an outdoor wall, and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Reference is now made to FIGS. 1a-1c, where FIG. 1a is a block diagram of a mobile terminal according to an embodiment of the present invention, and FIGS. 1b and 1c are conceptual diagrams showing an example of a mirror type display device related to the present invention in different directions.

The mirror type display 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

More specifically, the wireless communication unit 110 among the above-mentioned components can be installed between the mirror type display device 100 and the wireless communication system, between the mirror type display device 100 and the mirror type display device 100, May include one or more modules that enable wireless communication between mobile device 100 and a mobile terminal such as a smart phone, a smart watch, or between mirrored display device 100 and an external server. In addition, the wireless communication unit 110 may include one or more modules that connect the mirror-type display device 100 to one or more networks.

Referring now to FIG. 1a, the mirror type display 100 is shown having wireless communication unit 110 configured with several commonly implemented components. For instance, the wireless communication unit 110 typically includes one or more components which permit wireless communication between the mirror type display 100 and a wireless communication system or network within which the mobile terminal is located.

The wireless communication unit 110 typically includes one or more modules which permit communications such as wireless communications between the mirror type display 100 and a wireless communication system, communications between the mirror type display 100 and another mobile terminal, communications between the mirror type display 100 and an external server. Further, the wireless communication unit 110 typically includes one or more modules which connect the mirror type display 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1*a*, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mirror type display 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mirror type display 100 and a user, as well as function as the user input unit 123 which provides an input interface between the mirror type display 100 and the user.

The interface unit 160 serves as an interface with various types of external devices that can be coupled to the mirror type display 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mirror type display 100 may perform assorted control functions associated with a connected external device, in response to the external device being connected to the interface unit 160.

The memory 170 is typically implemented to store data to support various functions or features of the mirror type display 100. For instance, the memory 170 may be configured to store application programs executed in the mirror type display 100, data or instructions for operations of the mirror type display 100, and the like. Some of these application programs may be downloaded from an external server via wireless communication. Other application programs may be installed within the mirror type display 100 at time of manufacturing or shipping, which is typically the case for basic functions of the mirror type display 100 (for example, receiving a call, placing a call, receiving a message, sending a message, and the like). It is common for application programs to be stored in the memory 170, installed in the mirror type display 100, and executed by the controller 180 to perform an operation (or function) for the mirror type display 100.

The controller 180 typically functions to control overall operation of the mirror type display 100, in addition to the operations associated with the application programs. The controller 180 can provide or process information or functions appropriate for a user by processing signals, data, information and the like, which are input or output by the various components depicted in FIG. 1*a*, or activating application programs stored in the memory 170. As one example, the controller 180 controls some or all of the components illustrated in FIGS. 1*a*-1*c* according to the execution of an application program that have been stored in the memory 170.

The power supply unit 190 can be configured to receive external power or provide internal power in order to supply appropriate power required for operating elements and components included in the mirror type display 100. The power supply unit 190 may include a battery, and the battery may be configured to be embedded in the terminal body, or configured to be detachable from the terminal body.

Referring still to FIG. 1*a*, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mirror type display 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mirror type display 100 and a wireless communication system, communications between the mirror type display 100 and another mirror type display 100, or communications between the mobile terminal and a network where another mirror type display 100 (or an external server) is located, via wireless area networks. One example of the wireless area networks is a wireless personal area networks.

In some embodiments, another mobile terminal (which may be configured similarly to mirror type display 100) may be a wearable device, for example, a smart watch, a smart glass or a head mounted display (HMD), which can exchange data with the mirror type display 100 (or otherwise cooperate with the mirror type display 100). The short-range communication module 114 may sense or recognize the wearable device, and permit communication between the wearable device and the mirror type display 100. In addition, when the sensed wearable device is a device which is authenticated to communicate with the mirror type display 100, the controller 180, for example, may cause transmission of data processed in the mirror type display 100 to the wearable device via the short-range communication module 114. Hence, a user of the wearable device may use the data processed in the mirror type display 100 on the wearable device. For example, when a call is received in the mirror type display 100, the user may answer the call using the wearable device. Also, when a message is received in the mirror type display 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mirror type display 100. As another example, the cameras 121 may be located in a stereoscopic arrangement to acquire left and right images for implementing a stereoscopic image.

The microphone 122 is generally implemented to permit audio input to the mirror type display 100. The audio input can be processed in various manners according to a function being executed in the mirror type display 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mirror type display 100. The user input unit 123 may include one or more of a mechanical input element (for example, a key, a button located on a front and/or rear surface or a side surface of the mirror type display 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mirror type display 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mirror type display 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mirror type display 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mirror type display 100. For example, the display unit 151 may display execution screen information of an application program executing at the mirror type display 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The display unit 151 includes a mirror type display that provides a function of a display together with a mirror function. Accordingly, the display unit 151 can display (output) information processed in the mirror-type display device 100 while reflecting the image of the user located on the front side. For example, on the display unit 151, a user's image is projected as a mirror, and at the same time execution screen information of an application program driven by the mirror-type display device 100, a UI (User Interface) corresponding to the execution screen information, (Graphic User Interface) information can be displayed.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mirror type display 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mirror type display 100.

An optical output module 154 can output a signal for indicating an event generation using light of a light source. Examples of events generated in the mirror type display 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mirror type display 100. For example, the interface unit 160 can receive data transmitted from an external device, receive power to transfer to elements and components within the mirror type display 100, or transmit internal data of the mirror type display 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mirror type display 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mirror type display 100 is connected with an external cradle, the interface unit 160 can serve as a passage to allow power from the cradle to be supplied to the mirror type display 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mirror type display 100 may also be operated in relation to a network storage device that performs the storage function of the memory 170 over a network, such as the Internet.

The controller 180 can typically control the general operations of the mirror type display 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provides internal power and supply the appropriate power required for operating respective elements and components included in the mirror type display 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 1b and 1c, the disclosed mirror type display device 100 has a panel-shaped body mountable on a wall surface. However, the present invention is not limited thereto and can be applied to various structures. Here, the body can be understood as a concept of referring to the mirror-type display device 100 as at least one aggregate.

The mirror-type display device 100 includes a case 101 (e.g., a frame, a housing, a cover, and the like) which forms an appearance. Various electronic components 102 are disposed in the inner space of the case 101.

A display unit 151 is disposed on a front surface of the body to output information. As shown in the figure, the display unit 151 has a mirror 151a on the front surface and a display 151b on the rear surface of the mirror 151a. The front mirror 151a can reflect half of the light and partially transmit the half mirror. Accordingly, the light reflected from the mirror 151a can perform the same function as the mirror, and the light emitted from the display 151b disposed on the rear surface transmits through the mirror 151a to function as a display. Here, the display 151b may include a liquid crystal display (LCD) panel, or may include an organic EL (Organic Electro Luminescence) panel or a PDP (Plasma Display Panel).

In another embodiment, the display unit 151 includes a transparent display on the front surface thereof, and may include a light reflection paint or a reflective film (or a reflective polarizing film) used for a mirror on the rear surface of the transparent display. That is, when light is passed through some of the light emitting elements of the transparent display, the light is reflected by the light reflecting film to serve as a mirror, and the remaining part of the transparent display functions as a display. Here, the transparent display may be a conventional transparent organic electroluminescence display (OLED) or the like.

The camera 121 may be disposed on the front side of the case 101 together with the display unit 151 to photograph a user who wants to use the mirror function of the display unit 151. [

The mirror type display device 100 may include an acoustic output unit 152, a proximity sensor 141, an illuminance sensor 142, a microphone 122, and the like in addition to the display unit 151 and the camera 121. These configurations can be disposed in predetermined areas of the mirror-type display device 100, and can be omitted or replaced as needed.

The display unit 151 may simultaneously display both the mirror function and the display function by projecting the image of the user located on the front side and outputting the information processed by the mirror type display device 100. [For example, UI (User Interface) and GUI (Graphic User Interface) information can be displayed on the display unit 151 on which an image of the user is projected.

The display unit 151 may be configured to operate as a large-screen display by displaying one screen using two or more display units according to the implementation mode.

The display unit 151 may include a touch sensor that senses a touch to the display unit 151 so that a control command can be received by a touch method. When a touch is made to the display unit 151, the touch sensor senses the touch, and the controller 180 generates a control command corresponding to the touch based on the touch. The content input by the touch method may be a character or a number, an instruction in various modes, or a menu item that can be designated.

The camera 121 processes an image frame of a still image or a moving image obtained by the image sensor in the photographing mode or the video communication mode. The processed image frame can be displayed on the display unit 151 and can be stored in the memory 17

FIG. 2 is a schematic system configuration diagram for implementing a method of controlling a mirror-type display device 100 according to an embodiment of the present invention.

Referring to FIG. 2, a mirror type display device 100 according to an embodiment of the present invention includes a mirror type display unit 151, a camera 121 provided on a front surface of the display unit 151, a mobile terminal 200 Through the wireless communication unit 110 and the camera 121 that receive the signal of the mobile terminal 200 and the mobile terminal 200 carried by the user through the display unit 151, And a controller 180 for displaying an interface for recommending an operation mode of the recognized mobile terminal 200 on the display based on the received operation mode.

The controller 180 recognizes the user's wear based on the user's image input through the camera 121 and compares the recognized user's wear with pre-stored data to determine the user's wearing mode. For example, when a user wears a suit, a business mode, a casual mode when wearing casual clothes, an exercise mode when wearing a sportswear, a study mode when a uniform is worn, a driving mode when a driver wears a suit. A uniform mode or the like can be determined.

The controller 180 can recognize the mobile terminal 200 carried by the user based on the user's image input through the camera 121. The mobile terminal 200 may be a mobile phone, a smart phone, a laptop computer, a digital broadcasting terminal, a personal digital assistant (PDA), a portable multimedia player (PMP), a navigation device, a slate PC, A tablet PC, an ultrabook, a wearable device (e.g., a smartwatch, a glass glass, a head mounted display (HMD)), and the like.

The controller 180 can recognize the mobile terminal 200 by receiving the radio signal of the mobile terminal 200 through the wireless communication module. The controller 180 obtains the current setting information and stored information of the mobile terminal 200 and displays the information on the display unit 151 and displays the UI for setting the mode of the mobile terminal 200 on the display unit 151.

The controller 180 generates recommendation information for recommending the operation mode of the mobile terminal 200 based on the user dress mode. The controller 180 may display recommendation information on the display unit 151 and may provide a UI for setting the mode of the mobile terminal 200.

The controller 180 may transmit a signal requesting the mobile terminal 200 to set the operation mode according to the user input received through the UI.

With this configuration, the wearing mode of the user using the mirror function of the mirror-type display device 100 is recognized, the operation mode of the mobile terminal 200 held by the user is recommended, and the mirror mode display device 100 The mobile terminal 200 can request the mode setting according to the user input.

FIGS. 3 to 5 are flowcharts for explaining a control method of the mirror type display device 100 according to an embodiment of the present invention.

FIG. 3 is a flow chart for explaining a control method of the mirror type display device 100 according to an embodiment of the present invention and illustrates a process of recommending a mode of the mobile terminal 200 by recognizing a wearing mode of the user.

The controller 180 may detect a user located in front of the display unit 151 in step S110 and obtain an image of the user through the camera 121 in step S112. The controller 180 can enter the next control step when the user is located in front of the display unit 151 for a predetermined time or longer, if the user's face image is a registered user in advance.

The controller 180 recognizes the user's wear based on the user's image input through the camera 121, and compares the recognized user's wear with pre-stored data to determine the user's wearing mode (S114). For example, when a user wears a suit, a business mode, a casual mode when wearing casual clothes, an exercise mode when wearing a sportswear, a study mode when a uniform is worn, a driving mode when a driver wears a suit. A uniform mode or the like can be determined.

The controller 180 may receive the signal of the mobile terminal 200 held by the user through the wireless communication unit 110 (S116). The controller 180 can obtain the identification information and the setting information of the mobile terminal 200 according to the received signal. In addition, The controller 180 may perform a pairing with the mobile terminal 200 based on a signal of the mobile terminal 200, or may set a communication channel for data transmission/reception.

The controller 180 may determine an operation mode to be recommended to the mobile terminal 200 based on the determined wearing mode of the user (S118), and display the operation mode recommendation information on the mirror type display according to the determination result (S120). For example, when the wearing mode of the user is determined to be the business mode, the controller 180 may recommend setting the ring tone of the mobile terminal 200, such as a mobile phone or a smart watch, possessed by the user to the vibration or silent mode. If it is determined that the wearing mode of the user is the exercise mode, the controller 180 may recommend setting the smart watch of the user to a sport mode that provides functions such as exercise amount and heart rate measurement. In addition, the controller 180 can recognize the user's mobile terminal 200 based on the user's image. In addition, the controller 180 can determine a mode to be recommended according to the history of the mode, the frequency of setting of the mode, and the like set in the mobile terminal 200 according to the wearing mode of the user.

According to this configuration, the present invention can recognize the dress mode by photographing the dress of the user located on the front face of the mirror type display device 100 with the camera 121, and determine the mode of the mobile terminal 200 suitable for the dress mode so that the mode of the mobile terminal 200 can be recommended.

FIG. 4 is a flowchart illustrating a method of controlling the mirror type display device 100 according to an embodiment of the present invention. Referring to FIG. 4, the mode of the mobile terminal 200 is changed according to a user input to the mirror type display device 100.

The controller 180 of the mirror type display device 100 may display the current operation mode and the recommended mode of the mobile terminal 200 on the display unit 151 at step S210. The recommendation mode can be determined according to the result of recognizing the user dress. The controller 180 may provide a UI for setting a recommendation mode when the recommendation mode is displayed.

The controller 180 may receive a mode setting signal selected by the user through the touch sensor provided in the display unit 151 (S212).

The controller 180 may transmit a mode change signal to the mobile terminal 200 side according to the received mode setting signal (S214), and may check the mode change result (S216). The controller 180 may receive a mode change completion signal provided by the mobile terminal 200 or receive a signal for providing a mode setting state of the mobile terminal 200 to confirm whether or not the mode change has been successfully performed.

The controller 180 may display the mode change result on the display unit 151 according to the confirmation result (S218).

According to the present invention, the user can control the mobile terminal 200 in the mirror type display device 100, so that the user can control the operation of the mobile terminal 200 through the UI of the mirror type display part 151 so that the mode can be easily set.

FIG. 5 is a flowchart illustrating a method of controlling the mirror type display device 100 according to an embodiment of the present invention. After the mode of the mobile terminal 200 is set according to a recommendation of the mirror type display device 100, the user is returned to the mirror-type display device 100 again.

The controller 180 may sense a user located in front of the display unit 151 and recognize the wearing mode of the user and the operation mode of the mobile terminal 200 (S310). The user's dress mode can be determined by recognizing the user's dress from the image of the user photographed through the camera 121. The operation mode of the mobile terminal 200 can be recognized by receiving the wireless signal of the mobile terminal 200 using the wireless communication unit 110.

The controller 180 may determine whether the recognized mobile terminal 200 is the mobile terminal 200 that has previously set the operation mode (S312).

If the mobile terminal 200 has not previously set the operation mode, the controller 180 may recommend an operation mode corresponding to the user wearing mode (S316). That is, the operation mode recommendation process described with reference to FIG. 3 can be performed.

In the case of the mobile terminal 200 in which the operation mode has been previously set, the controller 180 may acquire the stored data after setting the operation mode from the mobile terminal 200 and display it on the display unit 151 (S314). For example, if it is determined that the mode of the mobile terminal 200 has been set to the sports mode, data of the heart rate, body temperature, and momentum of the user measured and stored in the mobile terminal 200 is obtained by operating in the sports mode, Type display device 100 according to the present invention. When it is determined that the mode of the mobile terminal 200 has been set to the conference mode, the conference mode is activated and the mobile terminal 200 executes the conference record recording, the catch call during the conference, Etc. can be obtained from the mobile terminal 200 and displayed on the display unit 151 of the mirror-type display device 100.

Thereafter, the controller 180 of the mirror-type display device 100 displays the result by controlling the corresponding function according to a user input received through the input unit 120 such as a touch sensor (S318). When the data stored in the mobile terminal 200 is displayed on the display unit 151, The controller 180 may provide a UI for storing or deleting the data, or may provide a UI to be stored in a server of the network have. In addition, it is possible to provide a UI for releasing or changing the operation mode set in the mobile terminal 200 before.

According to this configuration, when the mode of the mobile terminal 200 is set according to the recommendation of the mirror type display device 100, and the user again returns to the mirror type display device 100, the mobile terminal 200 The data can be displayed on the display unit 151 of the mirror-type display device 100 as a result of executing the set mode. In addition, the UI for storing and deleting the result data of the mobile terminal 200 being displayed in the mirror-type display device 100 and the UI for releasing or changing the set mode can be provided. Accordingly, the user can confirm and manage data stored in the mobile terminal 200 through the mirror-type display device 100 and change the operation mode without directly operating the mobile terminal 200.

A control method of the mirror-type display device 100 according to the embodiment of the present invention will be described with reference to FIGS. 6 to 20.

FIGS. 6 to 8 are diagrams for explaining the control process of the mirror type display device 100 according to the embodiment of the present invention.

Referring to FIG. 6, the mirror-type display device 100 may be installed on a wall surface to perform a function of a mirror for projecting the shape of the user 10 located on the front surface of the mirror-type display unit 151, One area of the display unit 151 may be allocated to the data display area 50. A camera 121 is installed at an upper portion of the mirror-type display unit 151 to capture an image of the user 10.

If the face image of the user 10 is registered in the mirror type display device 100, the face of the user 10 is recognized from the image of the user 10 photographed through the camera 121.

The controller 180 recognizes the costume of the user 10 based on the image of the user 10 input through the camera 121 and compares the costume of the recognized user 10 with the pre-stored data. For example, when the user 10 wears a suit, he or she can judge the business mode.

The controller 180 recognizes the mobile terminal 200 held by the user 10 or receives the wireless signal transmitted from the mobile terminal 200 from the image of the user 10 input through the camera 121 so that the device 200 can be recognized. In this description, the mobile terminal 200 may be a smart watch.

The controller 180 may display the recommendation mode information 50*a* of the mobile terminal 200 in the data display area 50 of the display unit 151 and provide a UI 50*b* for setting the recommendation mode. The controller 180 may recommend that the user 10 set the smart watch to the business mode when the dress mode is determined to be the business mode. Therefore, the recommendation mode information 50*a* of the mobile terminal 200 can be displayed as a business wearable setting. The controller 180 may provide a UT 50*b* for setting the mode of the smart watch of the user 10 to the business mode. For example, menus such as alarm strength setting, conference recording setting, voice recording function setting, gesture input setting, and the like can be provided.

Referring to FIGS. 7 and 8, the user can change the setting of the smart watch using the UI (50*b*) displayed on the display unit 151.

The controller 180 receives the user signal through the UI (50*b*). As shown in FIG. 7, an input for dragging the control bar of the alarm intensity setting menu. The controller 180 may transmit a signal for adjusting the alarm strength to the smart watch side according to the received drag input.

On the other hand, as shown in FIG. 8, a touch input for turning on/off the conference recording function can be received. According to the received touch input, the controller 180 can transmit a signal for turning on/off the conference recording function to the smart watch side.

FIGS. 9 to 12 are diagrams for explaining the control process of the mirror type display device 100 according to the embodiment of the present invention. The user located on the front surface of the mirror type display 151 and the user's mobile terminal 200.

When the user is located on the front surface of the mirror-type display 151, the controller 180 can detect proximity of the user using the image input through the camera 121 or the sensing unit 140. The controller 180 may automatically recommend the mode of the mobile terminal 200 when the user is located in front of the display unit 151. If the user is a registered user mode recommendation function. In addition, the controller 180 may perform a function of recommending a mode of the mobile terminal 200 when detecting a trigger operation of the user.

FIGS. 9A to 9C are diagrams illustrating a method of detecting a trigger operation of a user.

The controller 180 can photograph a user located at the front of the mirror-type display unit 151 and recognize the user's gesture. If the gesture of the user coincides with the predetermined gesture, The controller 180 recognizes the wearing mode of the user and the mobile terminal 200, and recommends the mode of the mobile terminal 200 according to the wearing mode.

The user's triggering operation includes an operation in which the user who is located on the front surface of the mirror-type display unit 151 faces the mirror-type display unit 151 as shown in FIG. 9A and then rotates. In addition, as shown in FIG. 9B, the user located on the front of the mirror-type display unit 151 may include a user's hand lifting a specific finger. 9C, when the user located on the front surface of the mirror-type display unit 151 touches the mirror-type display unit 151, the controller 180 provides a function of recommending the mode of the mobile terminal 200.

FIG. 10 shows an example in which The controller 180 displays the result of user recognition on the mirror-type display unit 151.

The controller 180 can photograph the image of the user located on the front surface of the mirror-type display unit 151 through the camera 121, and recognize the predetermined object from the image of the user. The object to be recognized from the image may include a face, a dress, a mobile terminal 200, and the like.

The controller 180 can recognize the wear of the user, the face of the user, and the mobile terminal 200 carried by the user from the input user's image. The controller 180 may display the recognition result on the image of the user projected on the mirror-type display unit 151. The controller 180 may display the recognition result in a box in an area of the recognized object in the user image projected on the mirror type display unit 151.

Here, the user confirms the recognition result displayed on the mirror-type display unit 151. And when there is an object that is not recognized by the mirror type display device 100 among the mobile terminal s 200 owned by the user, the user can directly register the device 200.

Referring to FIG. 11, if the user does not recognize the smart glass 201 among the mobile terminal s 200 owned by the user, the user can touch the smart glass 201 projected on the mirror-type display unit 151.

The controller 180 can re-recognize the image when the user touches an object projected on the mirror-type display unit 151.

Referring to FIG. 12, when the smart glass 201 selected by the user is recognized, the controller 180 may display a box on the smart glass 201 projected on the mirror-type display unit 151 to display the recognition result.

The controller 180 may display the box displayed on the smart glass 201 recognized by the user's selection as a box of a color different from the automatically recognized object. In addition, messages such as 'recognizing', 'recognition completion', and 'recognizing a new mobile terminal' can be displayed on the display unit 151.

Referring to FIG. 13, the controller 180 recognizes the user's wear and the mobile terminal 200 on the basis of the user's image obtained through the camera 121, determines the wearing mode of the user, and the controller 180 can recommend the operation mode of the mobile terminal.

The controller 180 recognizes the costume 60a worn by the user and compares the recognized costume with pre-stored data to determine the costume mode of the user. For example, when the user wears a suit, it can be determined as a business mode. The controller 180 may determine an operation mode to be recommended to the mobile terminal 200 based on the determined wearing mode of the user, and may provide the operation mode recommendation information according to the determination result.

The controller 180 displays the recommendation mode information 50a of the mobile terminal 200 in the data display area 50 of the mirror type display unit 151 and the UIs 50b and 50c for setting the recommendation mode. The controller 180 may recommend that the user 10 set the smart watch to the business mode when the dress mode is determined to be the business mode. Therefore, the recommendation mode information 50a of the mobile terminal 200 can be displayed as 'business wearable setting'.

The controller 180 may provide the UI (50b and 50c) for setting the modes of the smart watch 200 and smart glass 201 of the user to the business mode.

The UI (50b and 50c) for setting the mode of the smart watch 201 and the smart glass 201 to the business mode display a sub menu for setting the mode of the corresponding device 200 when selecting each menu button can do.

Although the data display area 50 of the display unit 151 is allocated to the side surface of the display unit 151 in the above description, the position and size of the data display area 50 may variously be deformed.

For example, the recommended mode information 50a of the mobile terminal 200 is displayed in the upper area of the mirror-type display unit 151, and in the image projected on the mirror-type display unit 151. It is also possible to display the UI 50b for setting the mode of the smart watch and the UI (50c) for setting the mode of the smart glass in the area close to the smart glass 201.

In this way, when there are a plurality of mobile terminals 200, the controller 180 controls the UI (50b) for setting the mode of the smart watch according to the battery state of each device 200 or the number of sensors, And a UI (50b) for setting a mode. For example, if the smart watch and the smart glass can perform the same functions such as GPS, camera shooting, and voice recording, only one of the devices can provide a UI to perform the corresponding function. That is, in the case of the overlapping function, the UI can be provided to set the operation only in one of the plurality of mobile terminals. When recommending a function in each mobile terminal, the function may be recommended or not recommended considering the remaining battery power of the device. It is also possible to recommend that important functions be set preferentially according to the remaining battery power.

FIGS. 14 to 19 are diagrams illustrating the recommendation mode information 50a of the mobile terminal 200 provided according to the wearing mode of the user and the UI (50b and 50c) for setting the recommendation mode.

Referring to FIG. 14, the mirror-type display device 100 may be provided on a wall surface to perform a function of a mirror for projecting the shape of the user 10 located on the front surface of the mirror-type display unit 151, one area of the display unit 151 may be allocated to the data display area 50. A camera 121 is installed at an upper portion of the mirror-type display unit 151 to capture an image of the user 10.

The controller 180 recognizes the costume of the user 10 based on the image of the user 10 input through the camera 121 and compares the costume of the recognized user 10 with the pre-stored data. For example, when the user 10 wore casual clothes, it can be judged to be a casual mode.

The controller 180 recognizes the mobile terminal 200 held by the user 10 or receives the wireless signal transmitted from the mobile terminal 200 from the image of the user 10 input through the camera 121 So that the device can be recognized. In this description, the mobile terminal 200 is a smart watch.

The controller 180 may display the recommendation mode information 50a of the mobile terminal 200 in the data display area 50 of the display unit 151 and provide a UI 50b for setting the recommendation mode.

The controller 180 may recommend that the user 10 set the smart watch to the casual mode when the dress mode is determined to be the casual mode. Therefore, the recommendation mode information 50a of the mobile terminal 200 can be displayed as 'Smart Watch for Casual Setting'. The controller 180 may provide a UI 50b for setting the mode of the smart watch of the user 10 to the casual mode. For example, a menu such as a ring tone size, a camera gesture setting, a received message notification method, and the like can be provided.

In addition, the controller 180 may recommend replacing the band of the smart watch with a band that matches the casual attire, and other mobile terminal s 200 applicable to the casual mode may also be recommended.

Referring to FIG. 15, the mirror-type display device 100 may be provided on a wall surface to perform a function of a mirror for projecting the shape of the user 10 located on the front surface of the mirror-type display unit 151. One area of the display unit 151 may be allocated to the data display area 50. A camera 121 is installed at an upper portion of the mirror-type display unit 151 to capture an image of the user 10.

The controller 180 recognizes the costume of the user 10 based on the image of the user 10 input through the camera 121 and compares the costume of the recognized user 10 with the pre-stored data. For example, when the user 10 wore the uniform, he or she can determine the study mode.

The controller 180 recognizes the mobile terminal 200 held by the user 10 or receives the wireless signal transmitted from the mobile terminal 200 from the image of the user 10 input through the camera 121 so that the device 200 can be recognized. In the present description, the case where the mobile terminal 200 is a smart shoe will be exemplified.

The controller 180 displays the recommendation mode information 50a of the mobile terminal 200 in the data display area 50 of the mirror type display unit 151 and provides the UI 50b for setting the recommendation mode.

The controller 180 may recommend that the user 10 set the smart shoe to the study mode when the dress mode is determined to be the study mode. Therefore, the recommendation mode information 50a of the mobile terminal 200 can be displayed as 'smart shoe setting for study mode'. The controller 180 may provide a UI 50b for setting the mode of the smart shoe of the user 10 to the study mode. For example, a menu such as a ring tone size, a notification limit function, a radio restriction function, a call restriction function, and the like can be provided.

Referring to FIG. 16, the mirror-type display device 100 may be installed on a wall surface to perform a function of a mirror for projecting the shape of the user 10 located on the front surface of the mirror-type display unit 151, And one area of the mirror-type display unit 151 may be allocated to the data display area 50. A camera 121 is installed at an upper portion of the mirror-type display unit 151 to capture an image of the user 10.

The controller 180 recognizes the costume of the user 10 based on the image of the user 10 input through the camera 121 and compares the costume of the recognized user 10 with the pre-stored. For example, when the user 10 wears a sportswear, an athletic helmet, or the like, it can be determined that the user is in the exercise mode.

The controller 180 recognizes the mobile terminal 200 held by the user 10 or receives the wireless signal transmitted from the mobile terminal 200 from the image of the user 10 input through the camera 121 So that the device 200 can be recognized. In the present description, the case where the mobile terminal 200 is a smart glass will be exemplified.

The controller 180 displays the recommendation mode information 50a of the mobile terminal 200 in the data display area 50 of the mirror type display unit 151 and provides the UI 50b for setting the recommendation mode.

The controller 180 may recommend that the user 10 set the smart glass to the exercise mode when the dress mode is determined to be the exercise mode. Accordingly, the recommendation mode information 50a of the mobile terminal 200 can be displayed as 'smart glass setting for exercise mode'. The controller 180 may provide a UI 50b for setting the mode of the smart glass of the user 10 to the exercise mode. For example, a menu such as an activity tracking function, a health related application execution, and the like can be provided.

Also, the controller 180 may recommend other mobile terminal s 200 such as a smart watch applicable to the exercise mode, and may wear the corresponding devices if it is recognized that the gloves, helmet, It is also possible to recommend.

Referring to FIG. 17, the mirror-type display device 100 may be provided on a wall surface to perform a function of a mirror for projecting the shape of the user 10 located on the front surface of the mirror-type display unit 151, And one area of the mirror-type display unit 151 may be allocated to the data display area 50. A camera 121 is installed at an upper portion of the mirror-type display unit 151 to capture an image of the user 10.

The controller 180 recognizes the costume of the user 10 based on the image of the user 10 input through the camera 121 and compares the costume of the recognized user 10 with the pre-stored data. For example, when the user 10 wears a costume, a hat, etc. worn during operation, it can be determined that the mode is the operation mode.

The controller 180 recognizes the mobile terminal 200 held by the user 10 or receives the wireless signal transmitted from the mobile terminal 200 from the image of the user 10 input through the camera 121 So that the device 200 can be recognized. In this description, the mobile terminal 200 is a smart watch.

The controller 180 displays the recommendation mode information 50a of the mobile terminal 200 in the data display area 50 of the mirror type display unit 151 and provides the UI 50b for setting the recommendation mode.

The controller 180 may recommend that the user 10 set the smart watch to the operation mode when the dress mode is determined to be the operation mode. Therefore, the recommendation mode information 50a of the mobile terminal 200 can be displayed as 'Smart Watch setting for operation mode'. The controller 180 may provide a UI 50b for setting the mode of the smart watch of the user 10 to the operation mode. For example, a menu can be provided such as a setting of a receiving method, a hands-free setting, a message reception notification setting, and the like.

In addition, the controller 180 may recommend other mobile terminals 200 applicable to the operation mode, or recommend wear such as gloves, sunglasses, etc. required for operation.

Referring to FIG. 18, the mirror-type display device 100 may be provided on a wall surface to perform a function of a mirror for projecting the shape of the user 10 placed on the front surface of the mirror-type display unit 151. And one area of the mirror-type display unit 151 may be allocated to the data display area 50. A camera 121 is installed at an upper portion of the mirror-type display unit 151 to capture an image of the user 10.

The controller 180 recognizes the costume of the user 10 based on the image of the user 10 input through the camera 121 and compares the costume of the recognized user 10 with the pre-stored data. For example, if the user 10 wears a uniform of a specific job, the user can determine the uniform mode.

The controller 180 recognizes the mobile terminal 200 held by the user 10 or receives the wireless signal transmitted from the mobile terminal 200 from the image of the user 10 input through the camera 121 so that the device 200 can be recognized. In the present description, the case where the mobile terminal 200 is a smart accessory will be exemplified.

The controller 180 displays the recommendation mode information 50a of the mobile terminal 200 in the data display area 50 of the mirror type display unit 151 and provides the UI 50b for setting the recommendation mode.

The controller 180 may recommend that the user 10 set the smart accessory to the uniform mode when the dress mode is determined to be the uniform mode. Accordingly, the recommendation mode information 50a of the mobile terminal 200 can be displayed as 'smart accessory setting for uniform mode'. The controller 180 may provide a UI 50b for setting the mode of the smart accessory of the user 10 to the uniform mode. For example, a menu such as an alarm setting, a vibration setting, an incoming call setting, an incoming message notification method, and the like can be provided.

In the case of wearing night wear for sleeping, a sleeping mode for recommending the setting of the mobile terminal 200 when sleeping, and a sleeping mode for wearing a sleeping suit, Various modes such as a climbing mode for recommending the setting of the device 200 can be added.

FIG. 19 is a diagram illustrating a state in which the mirror type display device 100 is provided with the information provided by the mirror type display device 100 when the mode of the mobile terminal 200 is set according to a recommendation of the mirror type display device 100.

The controller 180 senses a user located in front of the mirror type display unit 151 and recognizes the wearing mode of the user and the operation mode of the mobile terminal 200. The user's dress mode can be determined by recognizing the user's dress from the image of the user photographed through the camera 121. The operation mode of the mobile terminal 200 can be recognized by receiving the wireless signal of the mobile terminal 200 using the wireless communication unit 110.

The controller 180 determines whether the recognized mobile terminal 200 is the mobile terminal 200 that has previously set the operation mode and if the mobile terminal 200 has previously set the operation mode, and obtains the stored data from the mobile terminal 200 after setting the operation mode.

The controller 180 can display the acquired data on the mirror-type display unit 151. For example, information on the usage time, GPS used, map information, photo/video/audio information stored in the mode, sensor information of each device 200, battery usage information, wearing information. For example, if it is determined that the mode of the mobile terminal 200 has been set to the 'sports mode', data on the heart rate, body temperature, and exercise amount of the user measured and stored in the mobile terminal 200 is obtained And can be displayed on the mirror-type display unit 151 with the usage information 50*d*.

When the data stored in the mobile terminal 200 is displayed on the mirror type display unit 151, the controller 180 may provide the data and the UI 50*e* for controlling the functions of the mobile terminal 200. For example, it is possible to provide a UI for storing or deleting displayed data, or a UI for storing data in a server of a network. In addition, it is possible to provide a UI for releasing or changing the operation mode set in the mobile terminal 200 before.

When the storage is selected, the controller 180 can store the information in the designated folder, and the common folder such as a photograph or a moving image can be stored in the general folder.

The controller 180 may further provide a UI for whether to cancel or maintain the pairing state of each device 200 after the mode is released. Here, the controller 180 may provide a GUI of the mobile terminal 200 connected to the mirror display unit 151 so as to cancel the pairing state of the devices 200 according to the user's touch selection. When the pairing state is finally released, the device 200 enters a standby state, and the controller 180 can display the battery state of the device 200 on the mirror display.

The controller 180 stores the logging data for each dress and the device 200 in a memory or an external server so as to provide a recommendation mode by reflecting data stored in the wearing mode and the mobile terminal 200 when the mobile terminal 200 is recognized have.

According to this configuration, when the mode of the mobile terminal 200 is set according to the recommendation of the mirror type display device 100, and the user again returns to the mirror type display device 100, the mobile terminal 200 The data can be displayed on the mirror-type display unit 151 as a result of executing the set mode.

In addition, the UI for storing and deleting the result data of the mobile terminal 200 being displayed in the mirror-type display device 100 and the UI for releasing or changing the set mode can be provided. Accordingly, the user can confirm and manage data stored in the mobile terminal 200 through the mirror-type display device 100 and change the operation mode without directly operating the mobile terminal 200.

Further, by storing and managing the user dress mode set and acquired in the mirror-type display device 100 and the operation mode of the mobile terminal 200 and the resultant data in a memory or an external server, it is possible to improve accuracy and reliability in mode recommendation.

FIG. 20 is a flow chart for explaining a control method of the mirror type display device 100 according to another embodiment of the present invention, and illustrates a process of recommending a mode of the mobile terminal 200 by recognizing a dress mode of a plurality of users.

The controller 180 detects a plurality of users located in front of the mirror type display unit 151 in step S410 and acquires images of a plurality of users through the camera 121 in step S412. The controller 180 can detect a plurality of users by a method such as face recognition in an image and recognize a specific user when a face image of a user is registered in the mirror type display device 100.

The controller 180 can recognize the dress mode of each user based on the user's image input through the camera 121 (S414). For example, when a user wears a suit, a business mode, a casual mode when wearing casual clothes, an exercise mode when wearing a sportswear, a study mode when a uniform is worn, a driving mode when a driver wears a suit, a uniform mode or the like can be determined.

When the determination of the dress mode for the plurality of users is completed, it is confirmed whether the dress mode of the corresponding users is the same (S416).

If the dress mode of each user does not coincide with each other, the controller 180 recommends the operation mode of the mobile terminal 200 based on the dress mode of each user (S418).

If the dress modes of the respective users are equal to each other, the controller 180 recommends an operation mode of the mobile terminal 200 that can be shared by a plurality of users (S420). When the pasture mode of a plurality of users coincide, the controller 180 can set the common mode of collectively binding the sensors of the mobile terminal 200 carried by each user. For example, if two users holding a sportswear and a basketball ball take a hand gesture or a handshake gesture, it is determined that they are in a joint exercise mode, and the sensor information can be integratedly managed after synchronizing the mobile terminal s 200 with each other.

Thereafter, the controller 180 receives a mode selection signal for each mobile terminal 200 through the touch sensor of the mirror-type display unit 151 (S422).

The controller 180 may transmit a mode setting signal selected by the user to the mobile terminal 200 side of each user (S424).

According to the present invention, the mirror type display device 100 photographs the clothes of a plurality of users located on the front side with the camera 121 to recognize the dress mode of each user, and for the users who match the dress mode. It is possible to set a common mode for integrally managing the collected information by synchronizing the mobile terminal s 200 with each other.

FIGS. 21 and 22 are diagrams for explaining a control method of the mirror type display device 100 according to another embodiment of the present invention.

Referring to FIG. 21, the mirror type display device 100 can perform a function of a mirror for projecting images of the users 10*a* and 10*b* located on the front side, and one area of the mirror type display part 151 can display data Area 50. A camera 121 is installed on the upper part of the mirror-type display unit 151 to capture images of the users 10*a* and 10*b*.

The controller 180 can recognize the dress mode of each user from the images of the plurality of users 10*a* and 10*b* positioned in front of the mirror type display unit 151 to determine the dress mode.

The controller 180 can recommend an operation mode of the mobile terminal 200 that can be shared by a plurality of users when the dress modes of the plurality of users 10*a* and 10*b* match.

If both users are wearing sportswear, The controller 180 may determine the cooperative motion mode and synchronize the mobile terminal s 200 with each other, and then integrally manage the sensor information. Accordingly, the recommendation mode information 50*a* of the mobile terminal 200 can be displayed as 'joint motion mode wearable setting'.

The controller 180 may provide a UI 50*b* for synchronously managing the sensor information after synchronizing the mobile terminal s 200 of the plurality of users 10a and 10b. For example, menus such as calorie measurement, heart rate measurement, and a pedometer can be provided.

When there are a plurality of mobile terminal s 200, the controller 180 can set the modes to be set in the respective mobile terminal s 200 so that they do not overlap with each other according to the battery state of each device 200, the number of sensors, The function may be recommended or not recommended in consideration of the battery remaining amount of the device 200. It is also possible to recommend that important functions be set preferentially according to the remaining battery power.

In the above description, the operation mode of the mobile terminal 200 that The controller 180 can automatically share is recommended when the pasture mode of a plurality of users coincide. However, it is also possible to recommend an operation mode of the mobile terminal 200 that can be shared when a predetermined operation such as taking a hand or a handshake gesture is input by two users. Also, it is also possible to recommend the operation mode of the mobile terminal 200 that can share the face of a plurality of users registered in advance by registering the face of the user who intends to share the operation mode of the mobile terminal 200 in advance It is possible.

On the other hand, when there is no mode of operation of the mobile terminal 200 that can be shared by a plurality of users although the dress modes of the plurality of users 10a and 10b are the same, an operation suitable for each mobile terminal 200 Mode can be recommended.

Referring to FIG. 22, the mirror type display device 100 can perform a function of a mirror for projecting images of the users 10a and 10b located on the front side, and one area of the mirror type display part 151 can display data Area 50 as shown in FIG. A camera 121 is installed on the upper part of the mirror-type display unit 151 to capture images of the users 10a and 10b.

The controller 180 can recognize the dress mode of each user from the images of the plurality of users 10a and 10b positioned in front of the mirror type display unit 151 to determine the dress mode.

If the dress modes of the plurality of users 10a and 10b do not coincide with each other, The controller 180 can recommend the operation mode of the mobile terminal 200 based on the dress mode of each user.

When the first user 10a wears a business suit and the second user 10b wears a sportswear and a helmet, the controller 180 controls the mobile terminal 200 of the first user 10a. It is possible to recommend the operation mode and to recommend the operation mode of the mobile terminal 200 of the second user 10b.

The controller 180 displays the recommendation mode information of each mobile terminal 200 in the data display areas 50-1 and 50-2 of the mirror type display unit 151 and displays a UI for setting the recommendation mode.

The controller 180 sets the first data display area 50-1 in the area adjacent to the area where the first user 10a is projected and sets the second data display area 50-1 in the area adjacent to the area in which the second user 10b is projected. The display area 50-2 can be set.

The business mode mobile terminal 200 mode and the UI for mode setting provided to the first user 10a may be provided in the first data display area 50-1. The user mode UI for the mode and portable mode 200 of the exercise mode mobile terminal provided to the second user 10b may be provided in the second data display area 50-2.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely and are not to be considered as limiting the present invention. The present teachings can be readily applied to other types of methods and devices. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:

1. A mirror type display device comprising:
a display unit including:
a mirror on a front surface of the mirror type display device; and
a display on a rear surface of the mirror;
a camera provided on the front surface of the mirror type display device; and
a controller configured to:
when a user is located in front of the mirror type display device, recognize the user's clothing and a mobile terminal carried by the user through the camera, and
display, on the display, an interface for recommending an operation mode of the recognized mobile terminal based on the recognized clothing.

2. The mirror type display device of claim 1, wherein the controller is configured to recognize the user's clothing and the mobile terminal after the user is located in front of the mirror type display device for a preset time or more.

3. The mirror type display device of claim 1, wherein the controller is configured to recognize the user's clothing and the mobile terminal after a predetermined input is received.

4. The mirror type display device of claim 1, wherein the controller is configured to determine the user's wearing mode based on at least one of the user's clothes, caps, accessories, shoes, belongings or the mobile terminal obtained through the camera, and recommend the operation mode of the mobile terminal based on the determination result.

5. The mirror type display device of claim 1, further comprising a wireless communication unit,
wherein the controller is further configured to recognize the mobile terminal based on a signal of the mobile terminal received through the wireless communication unit.

6. The mirror type display device of claim 5, wherein the controller is configured to transmit a control signal for setting the operation mode of the mobile terminal through the wireless communication unit according to an input signal received through the interface displayed on the display.

7. The mirror type display device of claim 5, wherein the controller is configured to obtain an operation mode setting information of the mobile terminal and data stored in the mobile terminal through the wireless communication unit, and display, on the display, the obtained data.

8. The mirror type display device of claim 7, wherein the controller is configured to:
  determine whether or not the operation mode of the mobile terminal has been previously set on the basis of the operation mode setting information of the mobile terminal obtained through the wireless communication unit,
  obtain the data stored in the mobile terminal if the operation mode of the mobile terminal has been set, and
  display, on the display, the obtained data.

9. The mirror type display device of claim 8, wherein the controller is configured to display, on the display, an interface for receiving an input from the user for storing and deleting data stored in the mobile terminal, or changing the operation mode of the mobile terminal.

10. The mirror type display device of claim 1, wherein, when a plurality of mobile terminals is recognized, the controller is configured to determine a priority of the operation mode to be recommended based on a battery capacity of each mobile terminal, and recommend the operation mode of each mobile terminal according to the priority.

11. The mirror type display device of claim 1, wherein the controller is configured to display, on the display, an interface for recommending the user to set the operation mode of the recognized mobile terminal to at least one of a business mode, a casual mode, a study mode, an exercise mode, a sports mode, and a uniform mode based on the recognized user's clothing.

12. The mirror type display device of claim 1, wherein the controller is configured to:
  recognize clothing of a plurality of users located in front of the mirror type display device and recognize mobile terminals carried by the plurality of users via the camera, and
  recommend the operation mode of the recognized mobile terminals based on the clothing of the plurality of users.

13. The mirror type display device of claim 12, wherein when a wearing mode of the plurality of users are the same, the controller is configured to synchronize the recognized mobile terminal and collectively manage the data acquired from each the mobile terminal.

14. The mirror type display device of claim 12, wherein when a predetermined input is received, the controller is configured to synchronize the recognized mobile terminal and collectively manage the data acquired from each the mobile terminal.

15. A mirror type display device comprising:
  a display unit including:
    a mirror on a front surface of the mirror type display device; and
    a display on a rear surface of the mirror;
  a camera provided on a front surface of the mirror type display device and configured to capture an image of a user located in front of the mirror type display device:
  a wireless communication unit; and
  a controller configured to:
    determine a wearing mode of the user based on the image,
    recognize a mobile terminal carried by the user based on the image and based on a wireless signal received by the wireless communication unit,
    display, on the display, an interface for recommending an operation mode of the mobile terminal according to the determined wearing mode, and
    transmit a control signal for setting the operation mode of the mobile terminal through the wireless communication unit based on an input signal received through the interface.

16. The mirror type display device of claim 15, wherein the controller is configured to:
  obtain an operation mode of the mobile terminal and data stored in the mobile terminal via the wireless communication unit,
  display, on the display, the obtained data;
  display, on the display, an interface for receiving the user's input for storing and deleting the data stored in the mobile terminal, or changing the operation mode of the mobile terminal.

17. The mirror type display device of claim 15, wherein the controller is configured to:
  determine whether or not the operation mode of the mobile terminal has been previously set on the basis of the wireless signal,
  obtain data stored in the mobile terminal when the operation mode of the mobile terminal has been set, and
  display, on the display, the obtained data.

18. A method for controlling the mirror type display device, the mirror type display device including a display unit and a camera, the display unit including a mirror on a front surface of the mirror type display device and a display on a rear surface of the mirror,
  the method comprising:
    capturing, by the camera, an image of a user located in front of the mirror type display device;
    recognizing clothing of the user and a mobile terminal carried by the user from the image;
    determining an operation mode to be recommended for the recognized mobile terminal based on the recognized clothing; and
    displaying, on the display, an interface for recommending the operation mode of the mobile terminal.

19. The method of claim 18, the method further comprising:
  receiving an input signal received through the interface; and
  transmitting a control signal for setting the operation mode of the mobile terminal through a wireless communication unit based on the received input signal.

20. The method of claim 18, the method further comprising:
  determining whether or not the operation mode of the mobile terminal has been previously set based on a wireless signal received by the mirror type display device;
  obtaining data stored in the mobile terminal when the operation mode of the mobile terminal has been set; and
  displaying, on the display, the obtained data.

* * * * *